(12) United States Patent
Choi et al.

(10) Patent No.: US 10,969,779 B2
(45) Date of Patent: Apr. 6, 2021

(54) ELECTRONIC DEVICE FOR CONTROLLING VEHICLE, AND OPERATING METHOD THEREOF

(71) Applicant: Samsung Electronics Co., Ltd., Suwon-si (KR)

(72) Inventors: Hoon Choi, Hwaseong-si (KR); Sung-Dae Cho, Suwon-si (KR); Nara Cho, Seoul (KR); Dongwon Kim, Seoul (KR); Dongjin Park, Seoul (KR); Sang-Min Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 15/908,558

(22) Filed: Feb. 28, 2018

(65) Prior Publication Data

US 2018/0246508 A1    Aug. 30, 2018

(30) Foreign Application Priority Data

Feb. 28, 2017 (KR) .......................... 10-2017-0026116

(51) Int. Cl.
*G05D 1/00* (2006.01)
*B60R 25/24* (2013.01)
*G08C 17/02* (2006.01)

(52) U.S. Cl.
CPC ........... *G05D 1/0022* (2013.01); *B60R 25/24* (2013.01); *G08C 17/02* (2013.01)

(58) Field of Classification Search
CPC ....... G05D 1/0022; B60R 25/24; G08C 17/02
See application file for complete search history.

(56) References Cited

U.S. PATENT DOCUMENTS 9,082,241 B2 * 7/2015 Leong .................... B60R 25/24
9,214,083 B2 * 12/2015 Lim ........................ G08C 17/02
(Continued)

FOREIGN PATENT DOCUMENTS

EP    2612795 A1    7/2013
EP    2806406 A2    11/2014
(Continued)

OTHER PUBLICATIONS https://en.wikipedia.org/wiki/Radio_frequency (Year: 2020).*
(Continued)

*Primary Examiner* — Thomas G Black
*Assistant Examiner* — Tarek Elarabi

(57) ABSTRACT

Various embodiments of the present disclosure relate to an apparatus and a method for communicating with another electronic device in an electronic device. The electronic device includes: a first communication module configured to support low frequency communication; a second communication module configured to support cellular communication; at least one sensor; at least one processor; and a memory electrically connected with the processor, wherein, when being executed, the memory may store instructions that cause the at least one processor to detect a motion of the electronic device based on the at least one sensor, and to transmit a signal for controlling an activation state regarding the low-frequency communication with another electronic device to the another electronic device via the second communication module, based on motion information of the electronic device. Other embodiments are possible.

20 Claims, 13 Drawing Sheets

(56) References Cited

U.S. PATENT DOCUMENTS

| | | | | |
|---|---|---|---|---|
| 9,499,125 | B2* | 11/2016 | Akay | B60R 25/24 |
| 2005/0099275 | A1* | 5/2005 | Kamdar | B60R 25/2009 |
| | | | | 340/426.18 |
| 2011/0098878 | A1* | 4/2011 | Podolak | B60R 25/00 |
| | | | | 701/31.4 |
| 2016/0250996 | A1* | 9/2016 | Park | E05B 19/0082 |
| | | | | 701/2 |
| 2017/0160786 | A1* | 6/2017 | Ji | G06F 1/3206 |
| 2017/0193823 | A1* | 7/2017 | Jiang | G06F 3/017 |
| 2017/0241188 | A1* | 8/2017 | Kalhous | E05F 15/40 |
| 2018/0096546 | A1* | 4/2018 | Bartels | H04L 9/3271 |

FOREIGN PATENT DOCUMENTS

| | | | |
|---|---|---|---|
| EP | 2612795 B1 * | 7/2015 | |
| JP | 2017-030379 A | 2/2017 | |
| KR | 10-1141807 B1 | 5/2012 | |
| KR | 10-1240066 B1 | 3/2013 | |
| WO | 2016043951 A1 | 3/2016 | |

OTHER PUBLICATIONS https://en.wikipedia.org/wiki/Cellular_frequencies (Year: 2020).*
European Patent Office, "European Search Report," Application No. EP 18158995.3, dated Jul. 17, 2018, 7 pages.
Yu,Tukwon, "Smart key can be hacked in 1 second," YTN, Mar. 27, 2016, 6 pages. Retrieved from: http://www.ytn.co.kr/_ln/0102_201603271548135592.
Communication pursuant to Article 94(3) EPC dated Nov. 5, 2020 in connection with European Application No. 18158995.3, 5 pages.

* cited by examiner

ELECTRONIC DEVICE FOR CONTROLLING VEHICLE, AND OPERATING METHOD THEREOF

CROSS-REFERENCE TO RELATED APPLICATION AND CLAIM OF PRIORITY

The present application is related to and claims priority to Korean Application No. 10-2017-0026116, filed Feb. 28, 2017, the contents of which are incorporated herein by reference.

TECHNICAL FIELD

Various embodiments of the present disclosure relate to an electronic device for controlling a vehicle and an operating method thereof.

BACKGROUND

With the development of information and communication technology, vehicles are developing into smart cars having electronic devices mounted therein to provide Internet and mobile services. Along with this, keys of vehicles are developing into smart keys that can control vehicles via communication with electronic devices mounted in the vehicles. An electronic device for a vehicle and a smart key communicate with each other according to a passive keyless entry (PKE) system to control the ignition of the vehicle or to open and close a door. According to the PKE system, the electronic device for the vehicle transmits a low frequency (LF) signal to the smart key when the ignition of the vehicle is turned off. The smart key receiving the LF signal transmits an ultra high frequency (UHF) signal to the electronic device for the vehicle in response to the LF signal. Upon receiving the UHF signal, the electronic device for the vehicle may determine that there is a driver in the proximity of the vehicle and may turn on the ignition of the vehicle and open the door.

SUMMARY

In the PKE system, the LF signal can reach distances of a few meters. Therefore, when a distance between the vehicle and the smart key are tens of meters or longer, the LF signal transmitted from the electronic device for the vehicle may not reach the smart key, and thus security of the vehicle can be ensured. However, when the LF signal is artificially amplified by a user having an illegal purpose, the LF signal may reach the smart key which is distanced from the vehicle by tens of meters or longer. In this case, the smart key may transmit the UHF signal to the electronic device for the vehicle in response to the received LF signal, and the electronic device for the vehicle may open the door of the vehicle in response to the UHF signal being received.

To address the above-discussed deficiencies, it is a primary object to provide at least the advantages described below. Accordingly, the present disclosure provides a method and an apparatus for communicating between an electronic device for a vehicle and a key electronic device to strengthen security of the vehicle.

According to an aspect of the present disclosure, there is provided an electronic device including: a first communication module configured to support low frequency communication; a second communication module configured to support cellular communication; at least one sensor; at least one processor; and a memory electrically connected with the processor, wherein, when being executed, the memory may store instructions that cause the at least one processor to detect a motion of the electronic device based on the at least one sensor, and to transmit a signal for controlling an activation state regarding the low-frequency communication with another electronic device to another electronic device via the second communication module, based on motion information of the electronic device.

According to another aspect of the present disclosure, there is provided an electronic device including: a first communication module configured to support low frequency communication; a second communication module configured to support cellular communication; at least one processor; and a memory electrically connected with the processor, wherein, when being executed, the memory may store the instructions that cause the at least one processor to: inactivate the first communication module; receive a signal for activating the first communication module from another electronic device via the second communication module; and activate the first communication module in response to the signal being received.

According to another aspect of the present disclosure, there is provided an operating method of an electronic device, including: detecting a motion of the electronic device; and, based on motion information of the electronic device, transmitting a signal for controlling an activation state regarding low-frequency communication with another electronic device to another electronic device via a cellular communication network.

According to another aspect of the present disclosure, there is provided an operating method of an electronic device, including: inactivating a first communication module for low frequency communication with another electronic device; receiving a signal for activating the first communication module from another electronic device via a second communication module supporting cellular communication; and activating the first communication module in response to the signal being received.

According to another aspect of the present disclosure, there is provided an electronic device including: a first communication module configured to support low frequency communication; at least one sensor; at least one processor; and a memory electrically connected with the processor, wherein, when being executed, the memory may store instructions that cause the at least one processor to detect a motion of the electronic device based on the at least one sensor, and to control an activation state of the first communication module based on motion information of the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
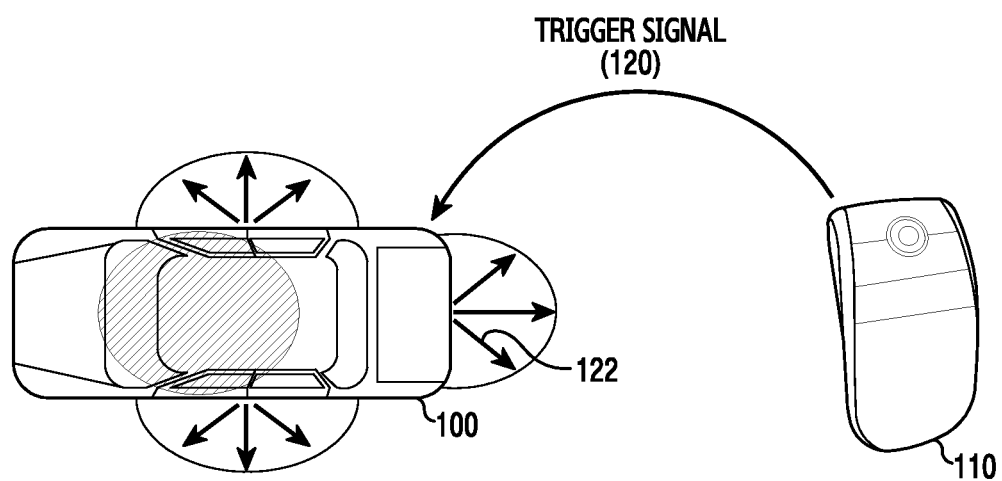
FIG. 1 is a view illustrating communication between a first electronic device and a second electronic device according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various exemplary embodiments of the present disclosure are described with reference to the accompanying drawings. It should be understood, however, that the present disclosure is not intended to limit the various exemplary embodiments of the present document to the particular form disclosed, but, on the contrary, is intended to cover modifications, equivalents, and alternatives falling within the spirit and scope of the various exemplary embodiments of the present document. Like reference numerals denote like components throughout the drawings. A singular expression includes a plural concept unless there is a contextually distinctive difference there between.

In the present document, an expression "A or B", "A and/or B", or the like may include all possible combinations of items enumerated together. Although expressions such as "$1^{st}$", "$12^{nd}$" "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, or a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, or an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, or various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the following description, it is assumed that the first electronic device is an electronic device for a vehicle and the second electronic device is a smart key for remotely controlling the vehicle, for convenience of explanation. However, in various embodiments described below, the first electronic device and the second electronic device are not limited to the electronic device for the vehicle and the smart key.

FIG. 1 illustrates a view showing communication between a first electronic device and a second electronic device according to various embodiments of the present disclosure.

According to various embodiments, each of the first electronic device 100 and the second electronic device 110 may include a plurality of communication modules for supporting different communication methods. For example, each of the first electronic device 100 and the second electronic device 110 may include a cellular module for supporting cellular communication, and an LF-UHF module for supporting LF-UHF. The LF-UHF module of the first electronic device 100 may include at least one of an LF transmitter for transmitting an LF signal, a UHF receiver for receiving a UHF signal, or a UHF transmitter for transmitting a UHF signal. The LF-UHF module of the second electronic device 110 may include at least one of an LF receiver for receiving an LF signal, a UHF transmitter for transmitting a UHF signal, or a UHF receiver for receiving a UHF signal. The LF signal may include, for example, a signal of a low frequency band corresponding to 120-135 KHz, and may reach distances of a few meters (for example, about 3 meters). The UHF signal may include, for example, a superhigh frequency signal corresponding to 315 MHz or 433 MHz, and may reach distances between tens of meters to hundreds of meters (for example, about 400 meters). In various embodiments described below, it is assumed that the first electronic device 100 includes the LF transmitter for transmitting an LF signal and the UHF receiver for receiving a UHF signal, and the second electronic device 110 includes the LF receiver for receiving an LF signal and the UHF transmitter for transmitting a UHF signal, for convenience of explanation. However, the present disclosure is not limited thereto.

According to various embodiments, the second electronic device 110 may control an activation state of the LF-UHF module included in the first electronic device 100 and/or the LF-UHF module included in the second electronic device 110 based on a motion of the second electronic device 110.

According to one embodiment, the second electronic device 110 may transmit, to the first electronic device 100 via the cellular module, a trigger signal 120 for controlling the activation state of the LF-UHF module included in the first electronic device 100 based on a motion of the second electronic device 110. For example, when the motion of the second electronic device 110 is not detected, the second electronic device 110 may transmit, to the first electronic device 100 via the cellular module, the trigger signal 120 for inactivating the LF-UHF module included in the first electronic device 100. In another example, when the motion of the second electronic device 110 is detected, the second electronic device 110 may transmit, to the first electronic device 100, the trigger signal 120 for controlling the activation state of the LF-UHF module according to whether the second electronic device 110 approaches the first electronic device 100. Specifically, when the second electronic device 110 approaches the first electronic device 100, the second electronic device 110 may transmit, to the first electronic device 100 via the cellular module, the trigger signal 120 for activating the LF-UHF module included in the first electronic device 100. When the second electronic device 110 does not approach the first electronic device 100, the second electronic device 110 may transmit, to the first electronic device 100 via the cellular module, the trigger signal 120 for inactivating the LF-UHF module included in the first electronic device 100.

According to one embodiment, the second electronic device 110 may control the activation state of the LF-UHF module included in the second electronic device 110 based on the motion of the second electronic device 110. For example, when the motion of the second electronic device 110 is not detected, the second electronic device 110 may inactivate the LF-UHF module included in the second electronic device 110. In another example, when the motion of the second electronic device 110 is detected, the second electronic device 110 may control the activation state of the LF-UHF module included in the second electronic device 110 according to whether the second electronic device 110 approaches the first electronic device 100. Specifically, when the second electronic device 110 approaches the first electronic device 100, the second electronic device 110 may activate the LF-UHF module included in the second electronic device 110. When the second electronic device 110 does not approach the first electronic device 100, the second electronic device 110 may inactivate the LF-UHF module included in the second electronic device 110. Controlling, by the second electronic device 110, the activation state of the LF-UHF module, may refer to controlling, by the second electronic device 110, the activation state of at least one of the LF receiver and/or the UHF transmitter.

According to various embodiments, the first electronic device 100 may receive, from the second electronic device 110 via the cellular module, the trigger signal for controlling the activation state of the LF-UHF module. The first electronic device 100 may control the activation state of the LF-UHF module in response to the trigger signal 120 being received. For example, when the trigger signal is received with the LF-UHF module being inactivated, the first electronic device 100 may activate the LF-UHF module. In another example, when the trigger signal 120 is received with the LF-UHF module being activated, the first electronic device 100 may inactivate the LF-UHF module. According to one embodiment, in response to the trigger signal being received, the first electronic device 100 may activate or inactivate the LF transmitter included in the LF-UHF module. Controlling, by the first electronic device 100, the activation state of the LF-UHF module, may refer to controlling, by the first electronic device 100, the activation state of at least one of the LF transmitter and/or the UHF receiver. When the LF-UHF module or the LF transmitter included in the LF-UHF module is activated, the first electronic device 100 may periodically transmit an LF signal 122 using the LF transmitter. The LF signal may be transmitted via a plurality of LF antennas (for example, an LF antenna having a coverage of a periphery of the door of the vehicle, and an LF antenna having a coverage of a periphery of the trunk of the vehicle) mounted in the vehicle.

Figure 2:
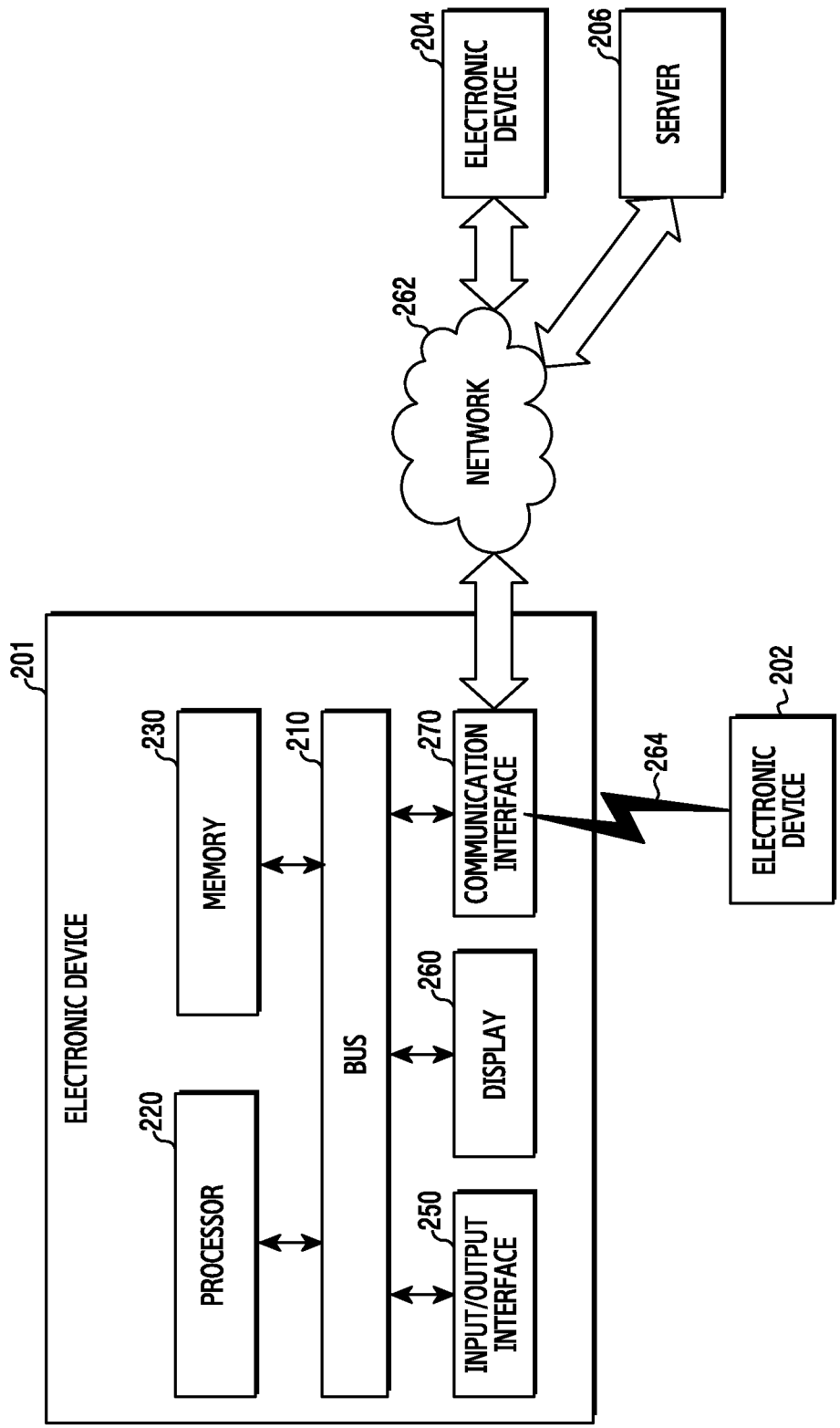
FIG. 2 is a view illustrating a network environment including a first electronic device according to various embodiments of the present disclosure.
Figure 3:
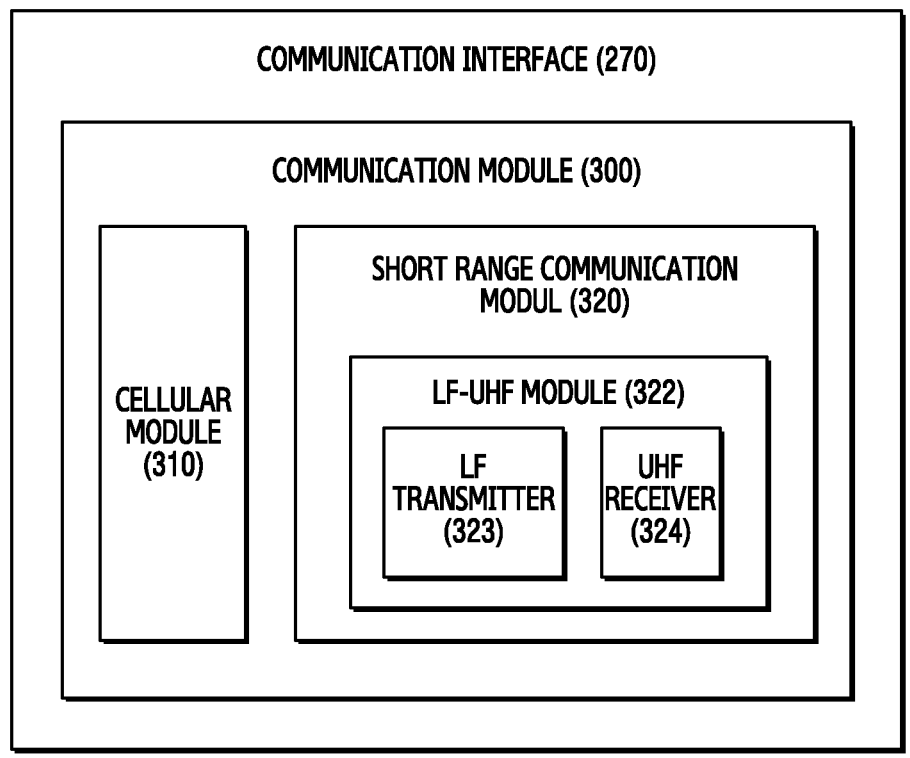
FIG. 3 is a block diagram illustrating a communication interface of the first electronic device according to various embodiments of the present disclosure.

FIG. 2 illustrates a view showing a network environment including a first electronic device according to various embodiments. FIG. 3 illustrates a block diagram of a communication interface of the first electronic device according to various embodiments. The first electronic device 201 of FIG. 2 may be the first electronic device 100 of FIG. 1.

Referring to FIG. 2, the first electronic device 201 may include a bus 210, a processor 220, a memory 230, an input/output interface 250, a display 260, and a communication interface 270. In some embodiments, the first electronic device 201 may omit at least one of the elements or may further include other element(s).

The bus 210 is configured to interconnect the elements 210-270 and may include a circuit for conveying communications (for example, a control message and/or data) among the elements.

The processor 220 may include one or more of a central processing unit (CPU), an application processor (AP), or a communication processor (CP). The processor 220 is configured to perform, for example, data processing or an operation associated with control and/or communication of at least one other element(s) of the first electronic device 201.

According to various embodiments, the processor 220 is configured to control an activation state of an LF-UHF module 322 included in the communication interface 270. According to one embodiment, controlling the activation state of the LF-UHF module 322 may include changing an activation state of at least one of an LF transmitter 323 and a UHF receiver 324. For example, the processor 220 may change the LF transmitter 323 and the UHF receiver 324 from an inactivation state to an activation state or may change them from an activation state to an inactivation state. In another example, the processor 220 may change the LF transmitter 323 from an inactivation state to an activation state or change the LF transmitter 323 from an activation state to an inactivation state, and may maintain the UHF receiver 324 in an activation state.

According to one embodiment, the processor 220 may control the activation state of the LF-UHF module 322 based on a signal that is received via a cellular communication network. For example, the processor 220 may receive a trigger signal from a second electronic device (for example, the second electronic device 110, a first external electronic device 202, or a second external electronic device 204) via a cellular module 310 supporting a cellular communication network. The trigger signal may be a signal that requests to change the activation state of the LF-UHF module 322 included in the first electronic device 201. According to one embodiment, the trigger signal may include information regarding a device of which the activation state should be changed. For example, the trigger signal may include information regarding the activation state of which one of the LF transmitter 323 or the UHF receiver 324 should be changed. According to one embodiment, the information regarding the activation state of which device should be changed by the trigger signal may be pre-set in the first electronic device 201 and the second electronic device 110. In this case, the trigger signal may not include the information regarding a device of which the activation state should be changed. For example, information indicating that the activation state of the LF receiver should be changed by the trigger signal may be pre-set in the first electronic device 201 and the second electronic device 110, and in this case, the processor 220 may change the activation state of the LF receiver when the trigger signal is received.

According to one embodiment, in response to the LF signal being transmitted, the processor 220 may control the activation state of the LF-UHF module 322 based on whether a UHF signal is received. For example, when the LF transmitter 323 is activated, the processor 220 may control the LF transmitter 323 to periodically transmit an LF signal. In response to the LF signal being transmitted, the processor 220 may wait for a UHF signal. When a UHF signal is not received, the processor 220 may inactivate the LF-UHF module 322 or the LF transmitter 323. For example, when a UHF signal is not received while the LF signal is transmitted a predetermined number of times, or when a UHF signal is not received for a predetermined time, the processor 220 may inactivate the LF-UHF module 322 or the LF transmitter 323. According to one embodiment, when the LF-UHF module 322 or the LF transmitter 323 is inactivated based on whether the UHF signal is received, the processor 220 may transmit, to the second electronic device 110 via the cellular module 310, a signal informing that the LF-UHF module 322 or the LF transmitter 323 is inactivated.

According to various embodiments, the processor 220 may control to transmit location information of the first electronic device 201 to the second electronic device 110. For example, the processor 220 may obtain location information of the first electronic device 201 or the vehicle at a time when the ignition of the vehicle is turned off, and may control to transmit the obtained location information to the second electronic device 110 that performs a key role of the vehicle.

According to various embodiments, the processor 220 may control a short range communication module 320 included in the communication interface 270 to connect short range communication with the second electronic device 110. According to one embodiment, the processor 220 may control to connect the short range communication with the second electronic device 110 with the LF-UHF module 322 or the LF transmitter 323 being inactivated. According to one embodiment, when a signal for requesting preparation of short-range communication connection is received via the cellular module 310, the processor 220 may control to connect short range communication with the second electronic device 110 in response to this signal. For example, the processor 220 may control the short range communication module 320 such that the first electronic device 201 operates as an access point (AP) to connect the short range communication. In another example, the processor 220 may control the short range communication module 320 to try to perform Bluetooth (BT) pairing to connect the short range communication.

The memory 230 may include a volatile and/or non-volatile memory. The memory 230 may be configured to store, for example, a command or data associated with at least one other element(s) of the first electronic device 201. According to one embodiment, the memory 230 may store software and/or a program.

The input/output interface 250 may serve as an interface to transmit a command or data inputted from a user or other external devices to other element(s) of the first electronic device 201. In addition, the input/output interface 250 may output a command or data received from other element(s) of the first electronic device 201 to the user or other external devices.

The display 260 may include, for example, a liquid crystal display (LCD), a light-emitting diode (LED) display, an organic LED (OLED) display, a microelectromechanical systems (MEMS) display, or an electronic paper display. The display 260 may display, for example, various contents (for example, a text, an image, a video, an icon, or a symbol) to the user. The display 260 may include a touch screen and may receive, for example, a touch, gesture, proximity, or hovering input using an electronic pen or a portion of a user's body.

The communication interface 270 may establish communication between the first electronic device 201 and an external device (for example, the second electronic device 110, the first external electronic device 202, the second external electronic device 204, or a server 206). For example, the communication interface 270 may be connected to a network 262 via wireless communication or wired communication to communicate with an external device. FIG. 3 illustrates a block diagram of the communication interface 270 according to various embodiments. According to various embodiments, the communication interface 270 may include a communication module 300 for wireless communication as shown in FIG. 3. The communication module 300 may include the cellular module 310 and the short range communication module 320.

The cellular module 310 may use at least one of, for example, long term evolution (LTE), LTE-Advanced (LTE-A), code division multiple access (CDMA), wideband CDMA (WCDMA), universal mobile telecommunications system (UMTS), wireless broadband (WiBro), global system for mobile communications (GSM), or 5G network. The cellular module 310 may provide voice communication, video communication, a messaging service, or an Internet service via the communication network. According to one embodiment, the cellular module 310 may perform at least one of the functions provided by the processor 220. According to one embodiment, the cellular module 310 may receive a trigger signal for controlling the activation state of the LF-UHF module 322 from the second electronic device 110. According to one embodiment, the cellular module 310 may constantly be maintained in the activation state by the processor 220.

The short range communication module 320 may include the LF-UHF module 322. The LF-UHF module 322 may include the LF transmitter 323 and the UHF receiver 324. The LF transmitter 323 may be connected with at least one LF antenna, and the UHF receiver 324 may be connected with at least one UHF antenna. According to various embodiments, the LF transmitter 323 may be activated or inactivated under the control of the processor 220. The LF transmitter 323 may periodically transmit an LF signal in the activated state. The UHF receiver 324 may receive a UHF signal from the second electronic device 110 (for example, the first external electronic device 202 or the second external electronic device 204).

According to various embodiments, the short range communication module 320 may further include at least one communication module in addition to the LF-UHF module 322. For example, the short range communication module 320 may further include at least one of wireless fidelity (WiFi), light fidelity (LiFi), Bluetooth, Bluetooth low energy (BLE), Zigbee, near field communication (NFC), or magnetic secure transmission.

According to various embodiments, the communication interface 270 may further include a global navigation satellite system (GNSS). The GNSS may include, for example, at least one of a global positioning system (GPS), a global navigation satellite system (Glonass), a BeiDou navigation satellite system (hereinafter, referred to as "BeiDou"), or Galileo (the European global satellite-based navigation system) according to a using region or bandwidth. Hereinafter, "GPS" and "GNSS" may be interchangeably used in the following descriptions.

The wired communication may include at least one of, for example, a universal serial bus (USB), a high-definition multimedia interface (HDMI), a recommended standard-232 (RS-232), or a plain old telephone service (POTS). The network 262 may include at least one of telecommunications networks, for example, a computer network (for example, LAN or WAN), an Internet, or a telephone network.

Figure 4:
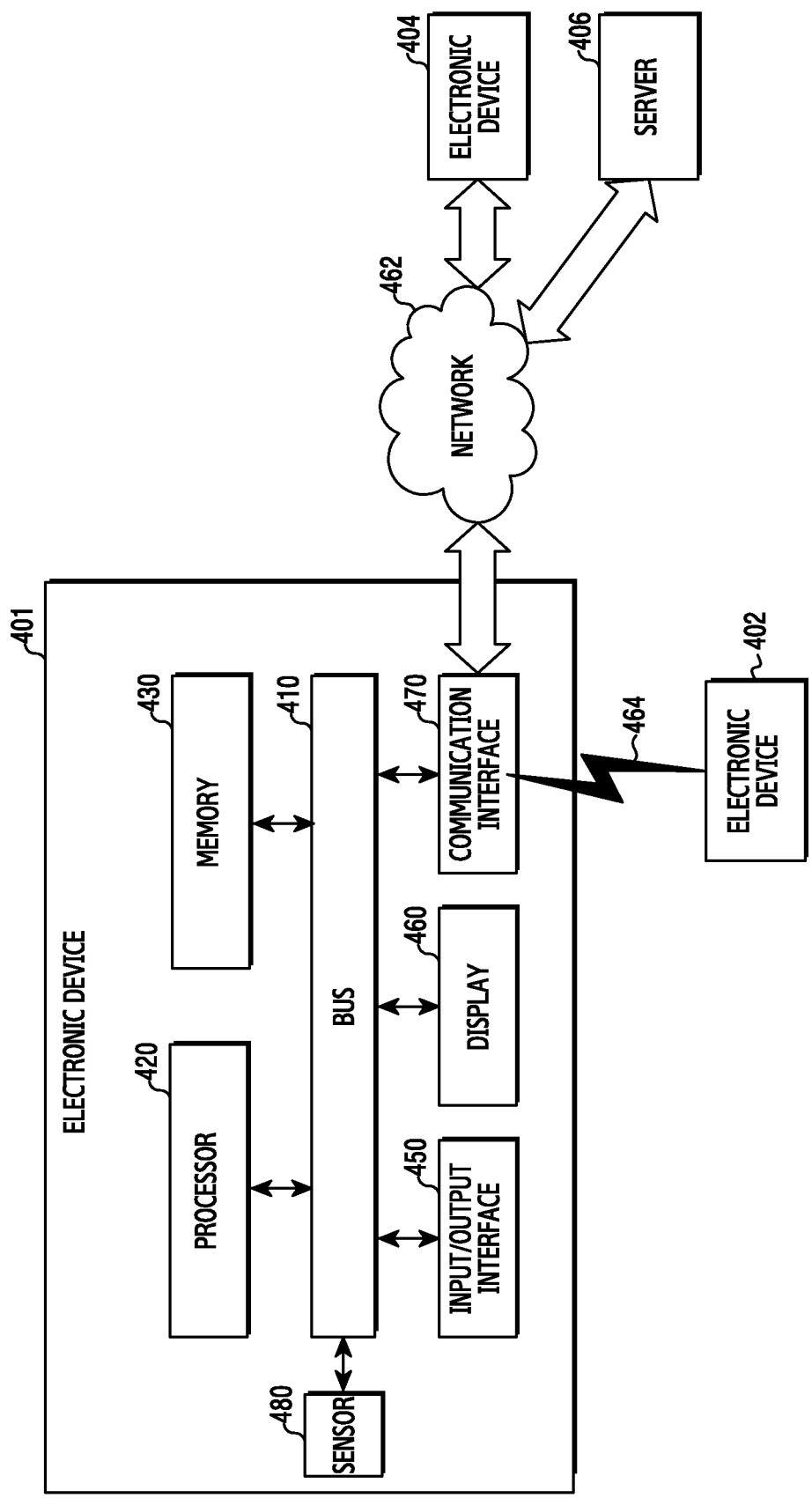
FIG. 4 is a view illustrating a network environment including a second electronic device according to various embodiments of the present disclosure.

FIG. 4 illustrates a view showing a network environment including a second electronic device according to various embodiments. The second electronic device 401 of FIG. 4 may be the second electronic device 110 of FIG. 1.

Referring to FIG. 4, the second electronic device 401 may include a bus 410, a processor 420, a memory 430, an input/output interface 450, a display 460, a communication interface 470, and a sensor 480. In some embodiments, the second electronic device 401 may omit at least one of the elements or may further include other element(s).

The bus 410 is configured to interconnect the elements 420-480, and may include a circuit for conveying communications (for example, a control message and/or data) among the elements.

The processor 420 may include one or more of a CPU, an AP, an image signal processor (ISP), or a CP. The processor 420 is configured to perform, for example, data processing or an operation associated with control and/or communication of at least one other element(s) of the second electronic device 401.

According to various embodiments, the processor 420 is configured to control an activation state of an LF-UHF module included in a first electronic device (for example, the first electronic device 100, 201, a first external electronic device 402, or a second external electronic device 404) and/or an LF-UHF module included in the second electronic device 401, based on a motion of the second electronic device 401. According to one embodiment, controlling the activation state of the LF-UHF module included in the first electronic device may include changing an activation state of at least one of an LF transmitter and a UHF receiver. According to one embodiment, controlling the activation state of the LF-UHF module included in the second electronic device 401 may include changing an activation state of at least one of an LF receiver and a UHF transmitter.

According to one embodiment, the processor 420 may detect a motion of the second electronic device 401 via the sensor 480. For example, the processor 420 may detect whether there is a motion of the second electronic device 401 using an acceleration sensor or a geomagnetic sensor. The processor 420 may determine whether the second electronic device 401 approaches the first electronic device 201 based on whether there is the motion of the second electronic device 401. For example, when no motion of the second electronic device 401 is detected for a predetermined time, the processor 420 may determine that the second electronic device 401 does not approach the first electronic device 201.

According to one embodiment, when a motion of the second electronic device 401 is detected, the processor 420 may determine whether the second electronic device 401 approaches the first electronic device 201 based on location information of the first electronic device 201 and location information of the second electronic device 401. For example, the processor 420 may determine whether the second electronic device 401 is within a threshold distance from the first electronic device 201 based on the location information of the first electronic device 201 and the location information of the second electronic device 401. When the second electronic device 401 is out of the threshold distance from the first electronic device 201, the processor 420 may determine that the second electronic device 401 does not approach the first electronic device 201. When the second electronic device 401 is within the threshold distance from the first electronic device 201, the processor 420 may determine whether a distance between the second electronic device 401 and the first electronic device 201 is reduced. When the distance between the second electronic device 401 and the first electronic device 201 is not reduced, the processor 420 may determine that the second electronic device 401 does not approach the first electronic device 201. When the distance between the second electronic device 401 and the first electronic device 201 is reduced, the processor 420 may determine that the second electronic device 401 approaches the first electronic device 201. According to an exemplary embodiment, the processor 420 may obtain the location information of the first electronic device 201 from the first electronic device 201 in advance. For example, when an event in which the ignition of the vehicle is turned off occurs, the second electronic device 401 may obtain location information corresponding to the time at which the ignition of the vehicle is turned off from the first electronic device 201 mounted in the vehicle. The location information of the first electronic device 201 may be location information of the vehicle in which the first electronic device 201 is mounted. The location information of the first electronic device 201 may be fixed. According to an exemplary embodiment, the processor 420 may obtain location information of the second electronic device 401 at the time when the event in which the ignition of the vehicle is turned off occurs, and may determine the obtained location information as location information of the first electronic device 201. For example, since the second electronic device 401 exists in the vehicle or exists in the proximity of the vehicle at the time when the event in which the ignition of the vehicle is turned off occurs, the second electronic device 401 may determine the location information of the second electronic device 401 corresponding to the time at which the event in which the ignition of the vehicle is turned off occurs as the location information of the first electronic device 201. According to an exemplary embodiment, the location information of the second electronic device 401 may be location information of the second electronic device 401 that is obtained at a time when a motion of the second electronic device 401 is detected. According to various embodiments, the location information of the first electronic device 201 and the second electronic device 401 may include at least one of latitude information, longitude information, and altitude information. The latitude and longitude may be obtained through a location information receiver (for example, a GPS receiver) included in the first electronic device 201 and/or the second electronic device 401, and the altitude information may be obtained through a barometer sensor of the first electronic device 201 and/or the second electronic device 401.

According to one embodiment, when a motion of the second electronic device 401 is detected, the processor 420 may try to connect short range communication (for example, BT or WiFi) with the first electronic device 201. The processor 420 may determine whether the second electronic device 401 approaches the first electronic device 201 based on whether a short range communication connection with the first electronic device 201 succeeds. For example, when the second electronic device 401 connects to the first electronic device 201 via BT or WiFi, the processor 420 may determine that the second electronic device 401 approaches the first electronic device 201. In another example, when the second electronic device 402 does not connect to the first electronic device 201 via BT or WiFi, the processor 420 may determine that the second electronic device 401 does not approach the first electronic device 201.

According to one embodiment, when the motion of the second electronic device 401 is detected, but it is possible to obtain the location information of the second electronic device 401, the processor 420 may determine whether the second electronic device 401 approaches the first electronic device 201 based on the location information of the first electronic device 201 and the location information of the second electronic device 401, as described above. According to one embodiment, when the motion of the second electronic device 401 is detected, but it is impossible to obtain the location information of the second electronic device 401, the processor 420 may determine whether the second electronic device 401 approaches the first electronic device 201 based on whether short range communication is connected with the first electronic device 201 as described above.

According to one embodiment, when the second electronic device 401 does not approach the first electronic device 201, the processor 420 may control to transmit, to the first electronic device 201 via the cellular communication network, a trigger signal for inactivating the LF-UHF module included in the first electronic device 201, or may inactivate the LF-UHF module included in the second electronic device 401. For example, while the second electronic device 401 does not approach the first electronic device 201, the processor 420 may inactivate the LF transmitter of the first electronic device 201, and control such that an LF signal is not transmitted from the first electronic device 201. In another example, while the second electronic device 401 does not approach the first electronic device, the processor 420 may inactivate the LF receiver of the second electronic device 401, and control such that an LF signal is not received from the first electronic device 201. In still another example, while the second electronic device 401 does not approach the first electronic device 201, the processor 420 may inactivate a UHF transmitter 528, and control such that a UHF response is not transmitted even when an LF signal is received from the first electronic device 201.

According to one embodiment, while the second electronic device 401 approaches the first electronic device 201, the processor 420 may control to transmit, to the first electronic device 201 via the cellular communication network, a trigger signal for activating the LF-UHF module included in the first electronic device 201, or may activate the LF-UHF module included in the second electronic device 401. For example, while the second electronic device 401 approaches the first electronic device 201, the processor 420 may activate the LF transmitter of the first electronic device 201 and control such that an LF signal is transmitted from the first electronic device 201. In another example, while the second electronic device 401 approaches the first electronic device, the processor 420 may activate the LF receiver of the second electronic device 401 and control such that an LF signal is received from the first electronic device 201. In still another example, while the second electronic device 401 approaches the first electronic device 201, the processor 420 may activate the UHF transmitter 528 and control such that a UHF response is transmitted when an LF signal is received from the first electronic device 201.

According to one embodiment, the processor 420 may receive, from the first electronic device 201 via the cellular communication network, a signal informing that the LF-UHF module and/or the LF transmitter of the first electronic device 201 is inactivated. The processor 420 may store information indicating that the LF-UHF module and/or the LF transmitter of the first electronic device 201 is inactivated in the memory 430 according to the received signal.

The memory 430 may include a volatile and/or non-volatile memory. The memory 430 may be configured to store, for example, a command or data associated with at least one other element(s) of the electronic device 401. According to one embodiment, the memory 430 may store software and/or a program. The memory 430 may be further configured to store information indicating an activation state of the LF-UHF module 322 or the LF transmitter 323 included in the first electronic device 100, 201.

The input/output interface 450 may be configured to serve as an interface to transmit a command or data inputted from a user or other external devices to other element(s) of the electronic device 401. In addition, the input/output interface 450 may be configured to output a command or data received from other element(s) of the second electronic device 401 to the user or external electronic devices. According to one embodiment, the input/output interface 450 may include a key pad, a dome switch, a physical button, a touch panel, or a jog & shuttle. The input/output interface 450 may be one or more sensor devices that configured to receive sensor data associated with biometric information, a motion, temperature, sound, video, etc.

The display 460 may include, for example, an LCD, an LED display, an OLED display, an MEMS display, or an electronic paper display. The display 460 may be configured to display, for example, various contents (for example, a text, an image, a video, an icon, and/or a symbol) to the user. The display 460 may include a touch screen and may be configured to receive, for example, a touch, gesture, proximity, or hovering input using an electronic pen or a portion of a user's body.

The communication interface 470 may be configured to establish communication between the second electronic device 401 and an external device (for example, the first electronic device 100, 201, the first external electronic device 402, the second external electronic device 404, or a server 406). For example, the communication interface 470 may be connected to a network 472 via wireless communication or wired communication to communicate with an external device (for example, the second external electronic device 404 or the server 406).

According to one embodiment, the wireless communication may include cellular communication using at least one of LTE, LTE-A, CDMA, WCDMA, UMTS, WiBro, GSM, or 5G network. The communication interface 470 may transmit, to an external device (for example, the first electronic device 100, 201, the first external electronic device 402, or the second external electronic device 404) via a cellular communication module, a trigger signal for controlling the activation state of the LF-UHF module under the control of the processor 420.

According to one embodiment, the wireless communication may include LF-UHF communication. The communication interface 470 may control the activation state of the LF-UHF module under the control of the processor 420, or may control the activation state of at least one of the LF receiver and the UHF transmitter included in the LF-UHF module.

Figure 5:
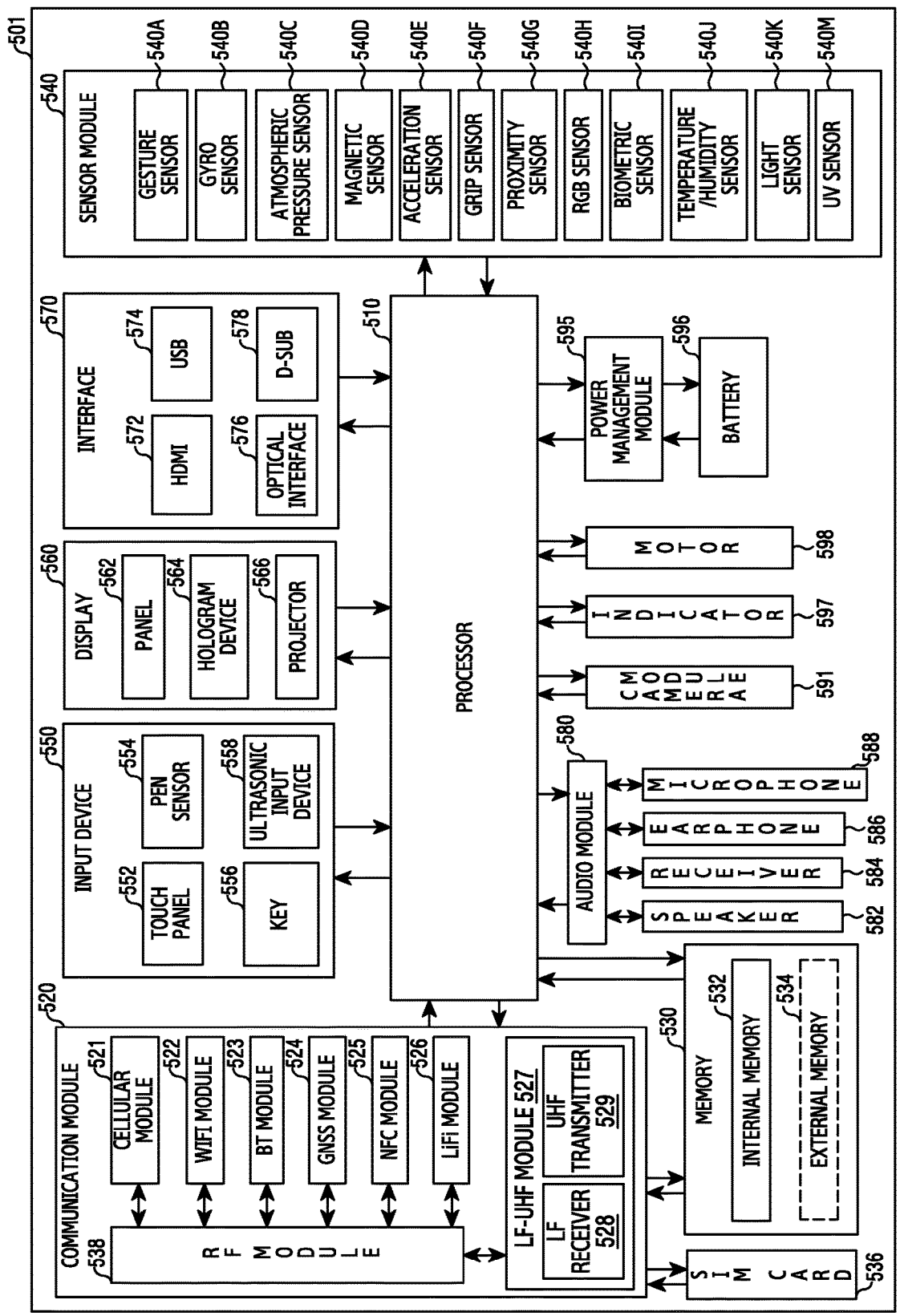
FIG. 5 illustrates a block diagram of a second electronic device according to various embodiments of the present disclosure.

According to one embodiment, the wireless communication may include short range communication. For example, as shown in FIG. 5, the short range communication may include at least one of WiFi, LiFi, Bluetooth, BLE, Zigbee, NFC, magnetic secure transmission, radio frequency (RF), or body area network (BAN). The communication interface 470 may be further configured to connect short range wireless communication with an external device (for example, the first electronic device 100, 201, the first external electronic device 402, or the second external electronic device 404) under the control of the processor 420.

According to one embodiment, the wireless communication may include a GNSS. The GNSS may be a GPS, a Glonass, BeiDou, or Galileo (the European global satellite-based navigation system). Hereinafter, "GPS" and "GNSS" may be interchangeably used in the following descriptions.

The communication interface 470 may obtain location information of the second electronic device 401 under the control of the processor 420.

The wired communication may include at least one of, for example, a USB, an HDMI, RS-232, power line communication, optical communication, or a POTS. The network 462 may include at least one of telecommunications networks, for example, a computer network (for example, LAN or WAN), an Internet, or a telephone network.

The sensor 480 may be configured to detect a motion of the second electronic device 401. The sensor 480 may detect a motion caused by a change in the location of the second electronic device 401, using, for example, an acceleration sensor 540E, a gyro sensor 540B, a geomagnetic sensor, a barometer sensor 540C, or the like (discussed below).

FIG. 5 illustrates a block diagram of a second electronic device according to various embodiments. The second electronic device 501 may be the second electronic device 110 shown in FIG. 1 or may include an entirety or a part of the second electronic device 401 shown in FIG. 4.

Referring to FIG. 5, the second electronic device 501 may include one or more processors 510 (for example, an AP), a communication module 520, a subscriber identification module 536, a memory 530, a sensor module 540, an input device 550, a display 560, an interface 570, an audio module 580, a camera module 591, a power management module 595, a battery 596, an indicator 597, and a motor 598.

The processor 510 may be configured to drive an operating system (OS) or an application program to control a plurality of hardware or software elements connected to the processor 510, and may process and compute a variety of data. The processor 510 may be implemented by a system on chip (SoC), for example. According to one embodiment, the processor 510 may further include a graphic processing unit (GPU) and/or an image signal processor (ISP). The processor 510 may include at least a portion (for example, a cellular module 521) of the elements illustrated in FIG. 5. The processor 510 may load and process an instruction or data, which is received from at least one of other elements (for example, a nonvolatile memory) at a volatile memory, and may store resulting data at a nonvolatile memory.

According to one embodiment, the processor 510 may control an activation state of the LF-UHF module 322 included in the first electronic device 100, 201, or may control an activation state of an LF-UHF module 527 included in the second electronic device 501 based on a motion of the second electronic device 501. According to one embodiment, the processor 510 may control the activation state of the LF-UHF module 322 included in the first electronic device 201 or of the LF-UHF module 527 included in the second electronic device 501 by additionally considering the location of the first electronic device 201, the location of the second electronic device 501, and whether short range communication is connected between the first electronic device 201 and the second electronic device 501.

The communication module 520 may have the same or similar configuration as or to that of the communication interface 470 of FIG. 4. The communication module 520 may include, for example, a cellular module 521, a WiFi module 522, a Bluetooth module 523, a GNSS module 524, an NFC module 525, a LiFi module 526, an LF-UHF module 527, and an RF module 538.

The cellular module 521 may be configured to provide voice communication, video communication, a messaging service, an Internet service or the like through a communication network. According to one embodiment, the cellular module 521 may perform discrimination and authentication of the second electronic device 501 within a communication network using the subscriber identification module 536 (for example, a SIM card). According to one embodiment, the cellular module 521 may perform at least a portion of functions that the processor 510 provides. According to one embodiment, the cellular module 521 may include a communication processor (CP). According to one embodiment, the cellular module 521 may transmit a trigger signal for controlling the activation state of the LF-UHF module 322 of an external device (for example, the first electronic device 100, 201) under the control of the processor 510. According to one embodiment, the cellular module 521 may receive a notification signal indicating the activation state of the LF-UHF module 322 from the external device under the control of the processor 510.

The WiFi module 522 or the Bluetooth module 523 may try to connect to an external device under the control of the processor 510. For example, the WiFi module 522 may try to connect to an external device which operates as an AP, or may try to perform Bluetooth pairing with an external device.

The GNSS module 524 may be configured to periodically obtain location information under the control of the processor 510.

The LF-UHF module 527 may include an LF receiver 528 and a UHF transmitter 529. The LF receiver 528 may receive an LF signal transmitted from an external device. The UHF transmitter 529 may transmit a UHF signal to the external device in response to the LF signal. The UHF transmitter 529 may transmit, to the external device, a UHF signal including a command for controlling the external device under the control of the processor 510. According to one embodiment, the LF-UHF module 527 may be activated or inactivated under the control of the processor 510. According to one embodiment, the LF-UHF module 527 may activate or inactivate at least one of the LF receiver 528 and the UHF transmitter 529 under the control of the processor 510.

According to a certain embodiment, at least a portion (for example, two or more) of the cellular module 521, the WiFi module 522, the Bluetooth module 523, the GNSS module 524, the NFC module 525, the LiFi module 526, and the LF-UHF module 527 may be included within one integrated chip (IC) or an IC package.

The RF module 538 may be configured to transmit and receive a communication signal (for example, an RF signal, a UHF signal). The RF module 538 may include, for example, a transceiver, a power amplifier module (PAM), a frequency filter, a low noise amplifier (LNA), an antenna, or the like. According to another embodiment, at least one of the cellular module 521, the WiFi module 522, the Bluetooth module 523, the GNSS module 524, the NFC module 525, and the LF-UHF module 527 may transmit and receive an RF signal through a separate RF module.

The memory 530 (for example, the memory 430 of FIG. 4) may include an internal memory 532 or an external memory 534, for example. For example, the internal memory 532 may include at least one of a volatile memory (for example, a dynamic random access memory (DRAM), a static RAM (SRAM), or a synchronous DRAM (SDRAM)), and a nonvolatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)).

The external memory 534 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 534 may be functionally or physically connected to the second electronic device 501 through various interfaces.

The subscriber identification module 536 may include, for example, a card or an embedded SIM including a subscriber identification module, and may include unique identification information (for example, an integrated circuit card identifier (ICCID)) or subscriber information (for example, integrated mobile subscriber identity (IMSI)).

The sensor module 540 may be configured to measure, for example, a physical quantity or may detect an operation state of the second electronic device 501, and may convert the measured or detected information to an electric signal. The sensor module 540 may include at least one of a gesture sensor 540A, a gyro sensor 540B, a barometer sensor 540C, a magnetic sensor 540D, an acceleration sensor 540E, a grip sensor 540F, a proximity sensor 540G, a color sensor 540H (for example, red, green, blue (RGB) sensor), a medical sensor 540I, a temperature/humidity sensor 540J, a light sensor 540K, or an ultraviolet (UV) sensor 540M. For example, the sensor module 540 may include at least one of an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 540 may further include a control circuit for controlling at least one sensor included therein. According to a certain embodiment, the second electronic device 501 may further include a processor which is a part of the processor 510 or a separate element from the processor 510 and is configured to control the sensor module 540. The processor may control the sensor module 540 while the processor 510 remains at a sleep state. For example, the temperature/humidity sensor 540J may include a plurality of temperature sensors arranged at different positions.

The input device 550 may include, for example, a touch panel 552, a (digital) pen sensor 554, a key 556, or an ultrasonic input device 558. The touch panel 552 may use at least one of a capacitive, resistive, infrared or ultrasonic detecting method. Also, the touch panel 552 may further include a control circuit. The touch panel 552 may further include a tactile layer to provide a tactile reaction to a user. The (digital) pen sensor 554 may be, for example, a part of a touch panel 552 or may include an additional sheet for recognition. The key 556 may include, for example, a physical button, an optical key, or a keypad. The ultrasonic input device 558 may be configured to detect an ultrasonic wave, which is generated from an input tool, through a microphone (for example, a microphone 588), and may check data corresponding to the detected ultrasonic wave.

The display 560 (for example, the display 460 of FIG. 4) may include a panel 562, a hologram device 564, a projector 566, and/or a control circuit for controlling the aforementioned elements. The panel 562 may be implemented to be flexible, transparent, or wearable. The panel 562 and the touch panel 552 may be integrated into one or more modules. The hologram device 564 may be configured to display a stereoscopic image in a space using a light interference phenomenon. The projector 566 may be configured to project light onto a screen so as to display an image. The screen may be arranged inside or outside the second electronic device 501. The interface 570 may include, for example, an HDMI 572, a USB 574, an optical interface 576, or a D-subminiature (D-sub) 578. The interface 570 may be included, for example, in the communication interface 470 illustrated in FIG. 4. The interface 570 may include, for example, a mobile high definition link (MHL) interface, a SD card/multi-media card (MMC) interface, or an infrared data association (IrDA) standard interface.

The audio module 580 may convert a sound and an electric signal in dual directions. At least a portion of the audio module 580 may be included, for example, in the input/output interface 450 illustrated in FIG. 4. The audio module 580 may process, for example, sound information that is inputted or outputted through a speaker 582, a receiver 584, an earphone 586, or a microphone 588.

The camera module 591 may be, for example, a device configured to shoot a still image or a video, and according to one embodiment, the camera module 591 may include, for example, at least one image sensor (for example, a front sensor or a rear sensor), a lens, an image signal processor (ISP), or a flash (for example, an LED or a xenon lamp). The camera module 591 may shoot an image including biometric information.

The power management module 595 may be configured to manage, for example, power of the second electronic device 501. The power management module 595 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method or an electromagnetic wave method, and may further include an additional circuit for wirelessly charging, for example, a coil loop, a resonance circuit, a rectifier, or the like. The battery gauge may measure, for example, a remaining capacity of the battery 596 and a voltage, current or temperature thereof while the battery is charged. The battery 596 may include, for example, a rechargeable battery or a solar battery.

The indicator 597 may be configured to display a specific state of the second electronic device 501 or a portion thereof (for example, the processor 510), such as a booting state, a message state, a charging state, or the like. The motor 598 may be configured to convert an electrical signal into a mechanical vibration and may generate vibration, a haptic effect, or the like. For example, the second electronic device 501 may include a mobile TV supporting device (for example, a GPU) for processing media data according to the standards of digital multimedia broadcasting (DMB), digital video broadcasting (DVB), MediaFlo™, or the like.

Each of the elements described in the present disclosure may be configured with one or more components, and the names of the elements may be changed according to the type of the electronic device. According to various embodiments, some elements of the electronic device (for example, the second electronic device 501) may be omitted or other additional elements may be added. Furthermore, some of the elements may be combined with each other so as to form one entity, and the functions of the elements may be performed in the same manner as before being combined.

According to various embodiments, an electronic device may include: a first communication module configured to support low frequency communication; a second communication module configured to support cellular communication; at least one sensor; at least one processor; and a memory electrically connected with the processor, and, when being executed, the memory may store instructions that cause the at least one processor to detect a motion of the electronic device based on the at least one sensor, and to transmit a signal for controlling an activation state regarding the low-frequency communication with another electronic device to another electronic device via the second communication module, based on motion information of the electronic device.

According to various embodiments, the instructions may include instructions that cause the processor to, when a motion of the electronic device is not detected, control to transmit a signal for inactivating a third communication module supporting low frequency communication of another electronic device to another electronic device via the second communication module, and, when the motion of the electronic device is detected, to transmit a signal for activating the third communication module to another electronic device via the second communication module.

According to various embodiments, the instructions may include instructions that cause the processor to transmit the signal for controlling the activation state regarding the low frequency communication with another electronic device to another electronic device via the second communication module, by further considering location information of the electronic device and location information of another electronic device.

According to various embodiments, the location information may include at least one of latitude information, longitude information, and altitude information.

According to various embodiments, the instructions may include instructions that cause the processor to transmit the signal for controlling the activation state regarding the low frequency communication with another electronic device to another electronic device via the second communication module, by further considering whether short range wireless communication is connected with another electronic device.

According to various embodiments, the electronic device may further include a display, and the instructions may include instructions that cause the processor to display information related to the activation state of the low frequency communication with another electronic device on the display.

According to various embodiments, the instructions may include instructions that cause the processor to control an activation state of the first communication module based on motion information of the electronic device.

According to various embodiments, the instructions may include instructions that cause the processor to receive a signal indicating an activation state of the low frequency communication module from another electronic device via the second communication module.

According to various embodiments, the electronic device may be an electronic device that remotely controls a vehicle, and another electronic device may be an electronic device that is mounted in the vehicle.

According to various embodiments, an electronic device may include: a first communication module configured to support low frequency communication; a second communication module configured to support cellular communication; at least one processor; and a memory electrically connected with the processor, and, when being executed, the memory may store the instructions that cause the at least one processor to: inactivate the first communication module; receive a signal for activating the first communication module from another electronic device via the second communication module; and activate the first communication module in response to the signal being received.

According to various embodiments, the instructions may include instructions that cause the processor to: control the first communication module to transmit a low frequency signal; when a response signal to the low frequency signal is not received, inactivate the first communication module; and transmit a signal indicating that the first communication module is inactivated to another electronic device via the second communication module.

According to various embodiments, the instructions may include instructions that cause the processor to receive a signal for inactivating the first communication module from another electronic device via the second communication module, and to inactivate the first communication module in response to the signal for inactivating being received.

According to various embodiments, the electronic device may be an electronic device that is mounted in a vehicle, and another electronic device may be an electronic device that remotely controls the vehicle.

According to various embodiments, an electronic device may include: a first communication module configured to support low frequency communication; at least one sensor; at least one processor; and a memory electrically connected with the processor, and, when being executed, the memory may store instructions that cause the at least one processor to detect a motion of the electronic device based on the at least one sensor, and to control an activation state of the first communication module based on motion information of the electronic device.

Figure 6:
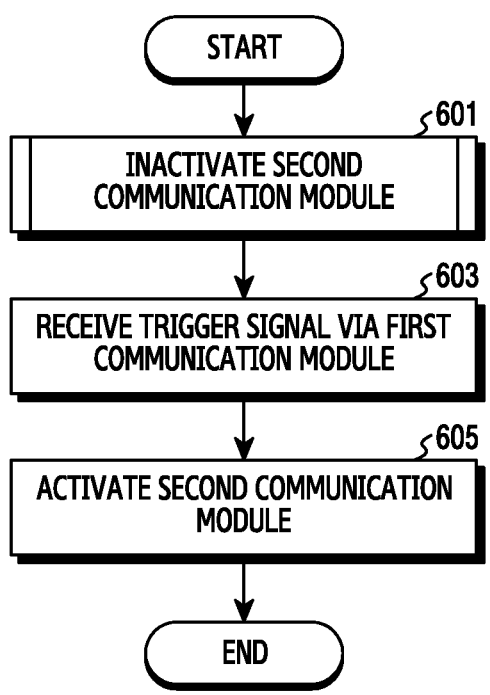
FIG. 6 illustrates a flowchart for controlling an activation state of a second communication module in a first electronic device according to various embodiments of the present disclosure.

FIG. 6 illustrates a flowchart for controlling an activation state of a first communication module in a first electronic device according to various embodiments. In the following embodiments, operations may be performed in sequence, but the present disclosure is not limited thereto. For example, the order of the operations may be changed or at least two operations may be performed in parallel. Herein, the first electronic device may be the first electronic device 100 of FIG. 1 and/or the first electronic device 201 of FIG. 2, and a second electronic device may be the second electronic device 110 of FIG. 1, the second electronic device 401 of FIG. 4 and/or the second electronic device 501 of FIG. 5.

Referring to FIG. 6, the first electronic device 201 may inactivate a second communication module in operation 601. For example, the second communication module may be an LF-UHF module including an LF transmitter and a UHF receiver. According to various embodiments, the first electronic device 201 may inactivate at least one of the LF transmitter and the UHF receiver. For example, the first electronic device 201 may maintain the UHF receive in an activation state, and may inactivate the LF transmitter. In another example, the first electronic device 201 may inactivate both the LF transmitter and the UHF receiver. According to one embodiment, in response to the second communication module being inactivated, the first electronic device 201 may wait for a trigger signal for controlling the activation state of the second communication module through the first communication module.

In operation 603, the first electronic device 201 receives a trigger signal for controlling the activation state of the second communication module via the first communication module. For example, the first electronic device 201 may receive a trigger signal for activating the second communication module from the second electronic device 401, which performs a key role of the first electronic device 201, via a cellular network supported by the first communication module. The trigger signal for activating the second communication module may be a signal for activating at least one of the LF transmitter and the UHF receiver.

In operation 605, the first electronic device 201 may activate the second communication module. According to various embodiments, the first electronic device 201 may activate at least one of the LF transmitter and the UHF receiver. For example, the first electronic device 201 may control both the LF transmitter and the UHF receiver included in the second communication module to operate in the activation state. When the second communication module is activated, the first electronic device 201 may periodically transmit, via the LF transmitter, an LF signal to determine whether there exists the second electronic device 401 performing a key role in the proximity of the first electronic device 201.

Figure 7:
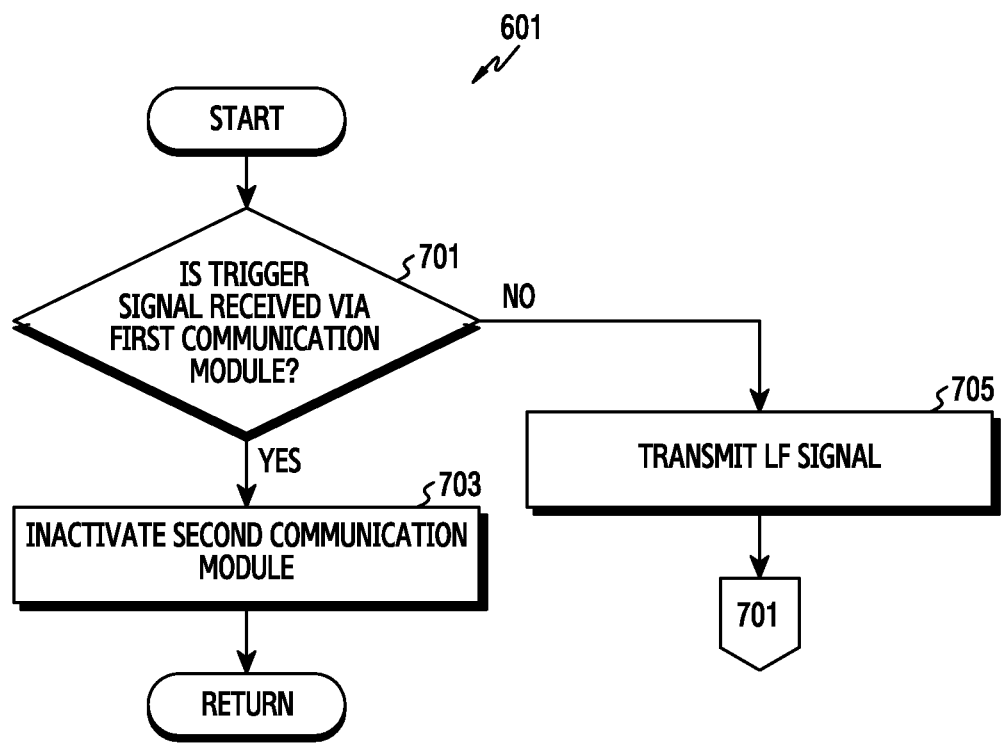
FIG. 7 illustrates a flowchart for inactivating the second communication module in the first electronic device according to various embodiments of the present disclosure.

FIG. 7 illustrates a flowchart for inactivating the second communication module in the first electronic device according to various embodiments. FIG. 7 illustrates operation 601 of FIG. 6 in detail. In the following embodiments, operations may be performed in sequence, but the present disclosure is not limited thereto. For example, the order of the operations may be changed or at least two operations may be performed in parallel. Herein, the first electronic device may be the first electronic device 100 of FIG. 1 and/or the first electronic device 201 of FIG. 2, and the second electronic device may be the second electronic device 110 of FIG. 1, the second electronic device 401 of FIG. 4, and/or the second electronic device 501 of FIG. 5.

Referring to FIG. 7, in operation 701, the first electronic device 201 may detect whether a trigger signal for controlling an activation state of the second communication module is received via the first communication module. For example, the first electronic device 201 may detect whether a trigger signal for inactivating the second communication module is received from the second electronic device 401 performing a key role of the first electronic device 201 via the first communication module supporting cellular communication. The trigger signal for inactivating the second communication module may be a signal for inactivating at least one of the LF transmitter and the UHF receiver.

When the trigger signal for controlling the activation state of the second communication module is received via the first communication module, the first electronic device 201 may inactivate the second communication module in operation 703. According to various embodiments, the first electronic device 201 may inactivate at least one of the LF transmitter or the UHF receiver included in the second communication module. For example, the first electronic device 201 may maintain the UHF receiver in the activation state, and may inactivate the LF transmitter. In another example, the first electronic device 201 may inactivate both the LF transmitter and the UHF receiver.

When the trigger signal for controlling the activation state of the second communication module is not received via the first communication module, the first electronic device 201 may transmit an LF signal via the second communication module in operation 705. For example, the first electronic device 201 may periodically transmit the LF signal via the second communication module, which is operating in the activation state.

Figure 8:
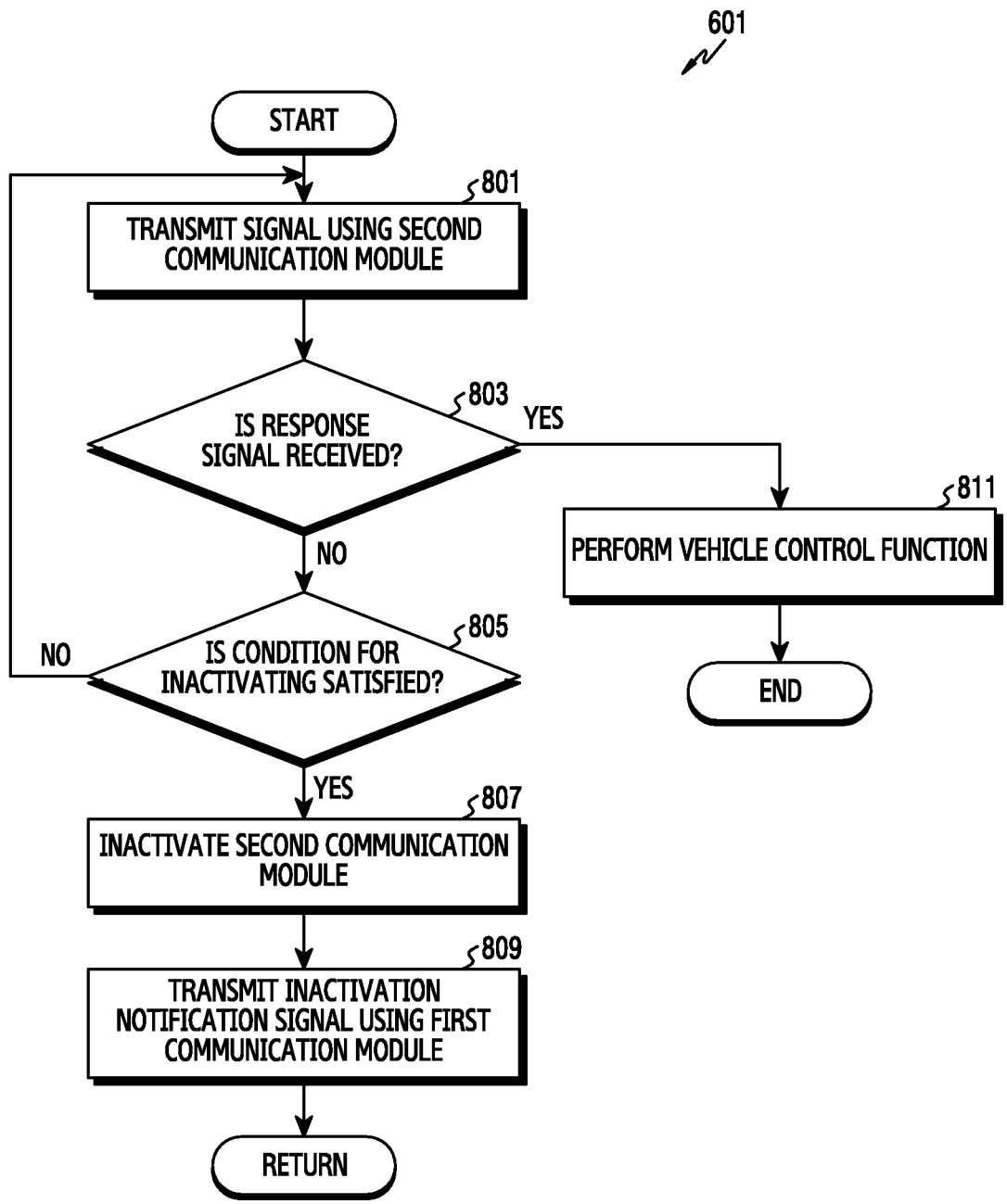
FIG. 8 illustrates a flowchart for inactivating the second communication module in a second electronic device according to various embodiments of the present disclosure.

FIG. 8 illustrates a flowchart for inactivating the second communication module in the second electronic device according to various embodiments. FIG. 8 illustrates operation 601 of FIG. 6 in detail. In the following embodiments, operations may be performed in sequence, but the present disclosure is not limited thereto. For example, the order of the operations may be changed and at least two operations may be performed in parallel. Herein, the first electronic device may be the first electronic device 100 of FIG. 1 and/or the first electronic device 201 of FIG. 2, and the second electronic device may be the second electronic device 110 of FIG. 1, the second electronic device 401 of FIG. 4, and/or the second electronic device 501 of FIG. 5.

Referring to FIG. 8, in operation 801, the first electronic device 201 may transmit a signal using the second communication module. For example, the first electronic device 201 may transmit an LF signal using the LF transmitter included in the second communication module to determine whether there exists the second electronic device 401 performing a key role in the proximity of the first electronic device 201. The LF signal may be periodically transmitted.

In operation 803, the first electronic device 201 may determine whether a response signal is received. For example, the first electronic device 201 may determine whether a UHF signal which is a response signal to the LF signal is received via the UHF receiver. The first electronic device 201 may compare identification information included in the received UHF signal and pre-stored identification information, and may determine whether the response signal is received from the second electronic device 401 performing the key role of the first electronic device 201. When a UHF signal including identification information different from the pre-stored identification information is received, the first electronic device 201 may determine that the response signal is not received from the second electronic device 401 performing the key role of the first electronic device 201. When a UHF signal including the same identification information as the pre-stored identification is received, the first electronic device 201 may determine that the response signal is received from the second electronic device 401 performing the key role of the first electronic device 201.

When the response signal is received, the first electronic device 201 may perform a vehicle control function in operation 811. For example, the first electronic device 201 may determine that there exists the second electronic device 401 performing the key role of the vehicle in the proximity of the vehicle in which the first electronic device 201 is mounted, and may perform an operation of turning on the ignition of the vehicle or opening a door.

When the response signal is not received, the first electronic device 201 may determine whether a condition for inactivating the second communication module is satisfied in operation 805. For example, the first electronic device 201 may determine whether a response signal, that is, a UFH signal, is not received while the LF signal is transmitted a predetermined number of times, or whether the UHF signal is not received although the LF signal is periodically transmitted for a predetermined time. When the UHF signal is not received while the LF signal is transmitted the predetermined number of times, or when the UHF signal is not received for the predetermined time, the first electronic device 201 may determine that the condition for inactivating the second communication module is satisfied. When the condition for inactivating the second communication module is not satisfied, the first electronic device 201 may return to operation 801.

When the condition for inactivating the second communication module is satisfied, the first electronic device 201 may inactivate the second communication module in operation 807. According to various embodiments, the first electronic device 201 may inactivate at least one of the LF transmitter or the UHF receiver included in the second communication module. For example, the first electronic device 201 may maintain the UHF receiver in the activation state and may inactivate the LF transmitter. In another example, the first electronic device 201 may inactivate both the LF transmitter and the UHF receiver.

In operation 809, the first electronic device 201 may transmit a signal for informing that the second communication module is inactivated to the second electronic device 401 via the first communication module. For example, when the LF transmitter is inactivated, the first electronic device 201 may transmit a signal for informing that the LF transmitter is inactivated to the second electronic device 401 via a cellular communication network. In another example, when both the LF transmitter and the UHF receiver are inactivated, the first electronic device 201 may transmit a signal for informing that the LF-UHF module is inactivated to the second electronic device 401 via the cellular communication network.

Figure 9:
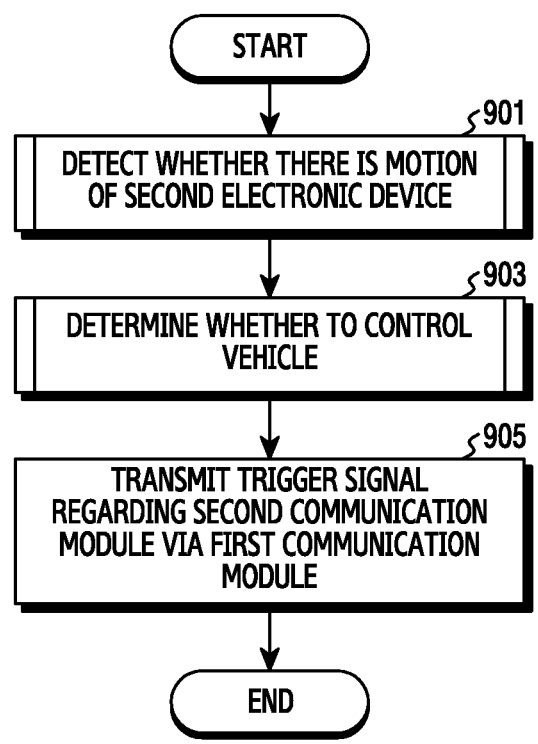
FIG. 9 illustrates a flowchart for controlling, in the second electronic device, an activation state of the second communication module included in the first electronic device according to various embodiments of the present disclosure.

FIG. 9 illustrates a flowchart for controlling, in the second electronic device, an activation state of the second communication module included in the first electronic device. In the following embodiments, operations may be performed in sequence, but the present disclosure is not limited thereto. For example, the order of the operations may be changed or at least two operations may be performed in parallel. Herein, the first electronic device may be the first electronic device 100 of FIG. 1 and/or the first electronic device 201 of FIG. 2, and the second electronic device may be the second electronic device 110 of FIG. 1, the second electronic device 401 of FIG. 4, and/or the second electronic device 501 of FIG. 5.

Referring to FIG. 9, in operation 901, the second electronic device 401 may detect whether there is a motion of the second electronic device 401. According to one embodiment, the second electronic device 401 may detect whether there is a motion of the second electronic device 401 based on at least one sensor (for example, an acceleration sensor 540E, a gyro sensor 540B, a geomagnetic sensor, a barometer sensor 540C, or the like).

In operation 903, the second electronic device 401 may determine whether to control the vehicle based on whether there is a motion of the second electronic device 401. For example, the second electronic device 401 may determine whether it is necessary to control the vehicle via the second communication module based on whether there is a motion of the second electronic device 401. According to one embodiment, the second electronic device 401 may determine whether the second electronic device 401 approaches the vehicle and/or whether the user has an intention of using the second electronic device 401 based on the motion of the second electronic device 401. When the motion of the second electronic device 401 is not detected, the second electronic device 401 may determine that the second electronic device 401 does not approach the vehicle or that the user has no intention of using the second electronic device 401, and may determine that it is not necessary to control the vehicle via the second communication module. In another example, when the motion of the second electronic device 401 is detected, the second electronic device 401 may determine that the second electronic device 401 approaches the vehicle or that the user has an intention of using the second electronic device 401, and may determine that it is necessary to control the vehicle via the second communication module.

In operation 905, the second electronic device 401 may transmit a trigger signal regarding the second communication module via the first communication module based on whether it is necessary to control the vehicle. For example, when it is necessary to control the vehicle, the second electronic device 401 may transmit a trigger signal for activating the LF-UHF module of the first electronic device 201 mounted in the vehicle to the first electronic device 201 via a cellular network supported by the first communication module. In another example, when it is not necessary to control the vehicle, the second electronic device 401 may transmit a trigger signal for inactivating the LF-UHF module of the first electronic device 201 mounted in the vehicle to the first electronic device 201 via the cellular network supported by the first communication module. The trigger signal regarding the second communication module may be a signal for controlling the activation state of at least one of the LF transmitter and the UHF receiver included in the LF-UHF module of the first electronic device 201.

Figure 10:
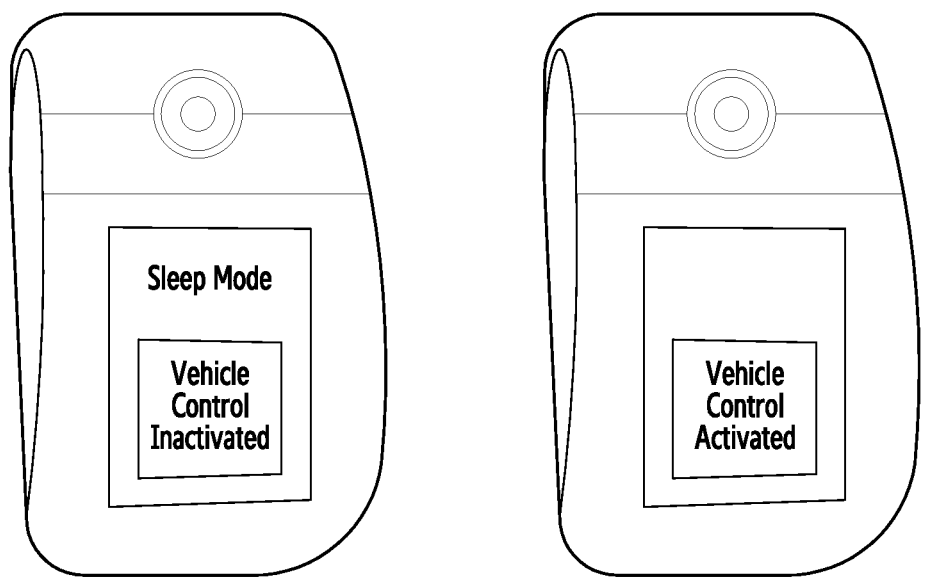
FIG. 10 is a view illustrating a screen configuration of the second electronic device for indicating a change in an activation state of the second communication module included in the first electronic device according to various embodiments of the present disclosure.

FIG. 10 is a view illustrating a screen configuration of the second electronic device for indicating that the activation state of the second communication module included in the first electronic device is changed according to various embodiments.

When a motion of the second electronic device 401 is not detected, the second electronic device 401 may display information indicating that the vehicle control function is inactivated on the screen as shown in the left view of FIG. 10. According to one embodiment, when a motion of the second electronic device 401 is not detected, the second electronic device 401 may convert a mode into a sleep mode and display information indicating that the second electronic device 401 operates in the sleep mode on the screen. When a motion of the second electronic device 401 is detected, the second electronic device 401 may display information indicating that the vehicle control function is activated on the screen as shown in the right view of FIG. 10.

Although FIG. 10 depicts that a message indicates whether the vehicle control function is activated, the present disclosure is not limited thereto. For example, the second electronic device 401 may display an image, an icon, and a graphic effect indicating whether the vehicle control function is activated. In another example, the second electronic device 401 may output an audio signal or a vibration indicating whether the vehicle control function is activated or not.

Figure 11:
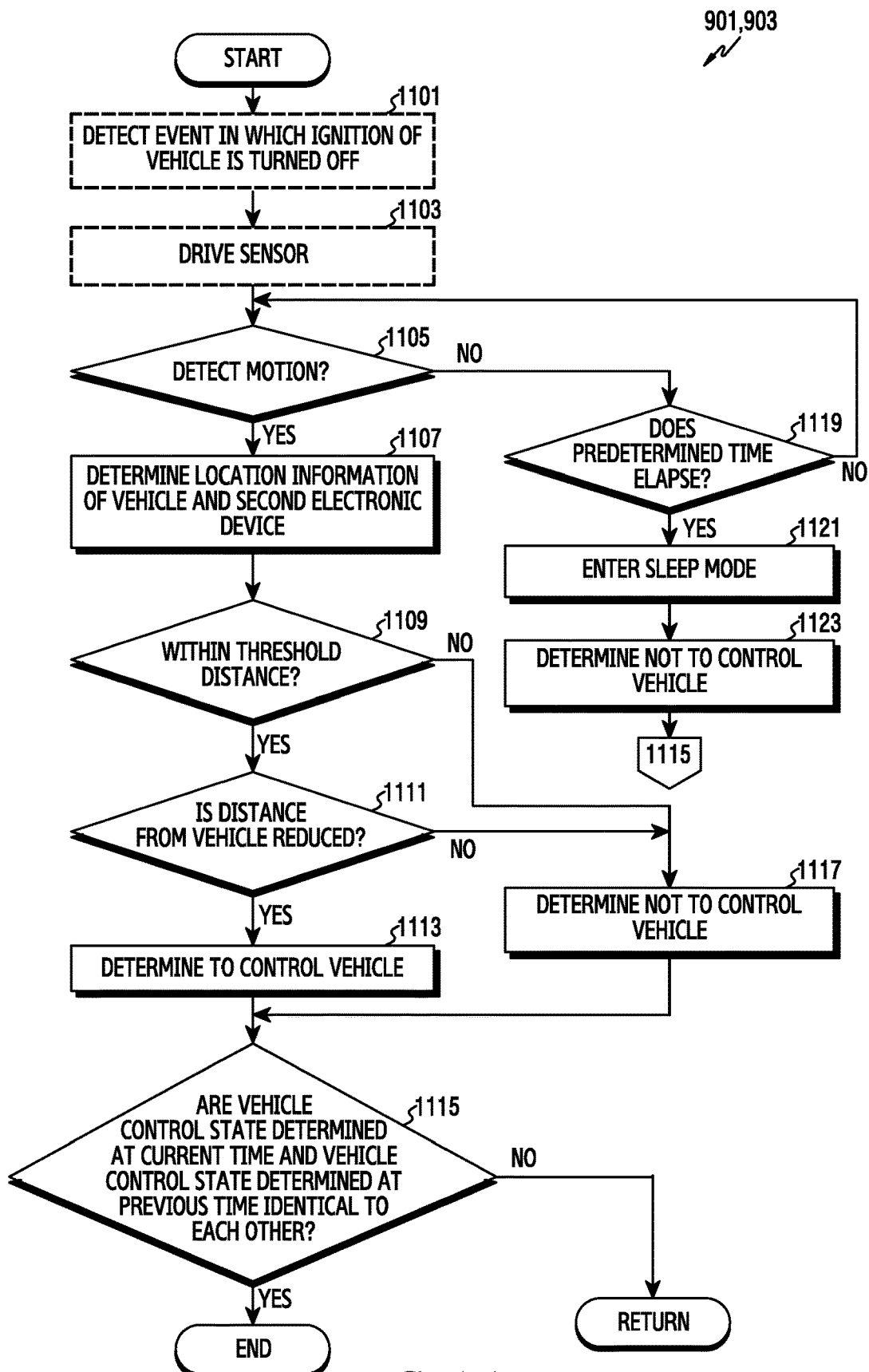
FIG. 11 illustrates a flowchart for controlling, in the second electronic device, an activation state of the second communication module included in the first electronic device based on sensor information and location information according to various embodiments of the present disclosure.

FIG. 11 illustrates a flowchart for controlling, in the second electronic device, an activation state of the second communication module included in the first electronic device based on sensor information and location information according to various embodiments. FIG. 11 illustrates operations 901 and 903 of FIG. 9 in detail. In the following embodiments, operations may be performed in sequence, but the present disclosure is not limited thereto. For example, the order of the operations may be changed or at least two operations may be performed in parallel. Herein, the first electronic device may be the first electronic device 100 of FIG. 1 and/or the first electronic device 201 of FIG. 2, and the second electronic device may be the second electronic device 110 of FIG. 1, the second electronic device 401 of FIG. 4, and/or the second electronic device 501 of FIG. 5. In FIG. 11, operations of the blocks represented by dashed lines may be omitted according to an embodiment.

Referring to FIG. 11, in operation 1101, the second electronic device 401 may detect an event in which the ignition of the vehicle is turned off. For example, the second electronic device 401 may detect that the event in which the ignition of the vehicle is turned off occurs by receiving a signal indicating that the ignition of the vehicle is turned off from the first electronic device 201. In another example, the second electronic device 401 may detect that the event in which the ignition of the vehicle is turned off occurs through a user input.

In operation 1103, the second electronic device 401 may drive at least one sensor. For example, the second electronic device 401 may drive a sensor module 540 (for example, an acceleration sensor 540E, a gyro sensor 540B, a geomagnetic sensor, and a barometer sensor 540C) to detect a motion of the second electronic device 401.

In operation 1105, the second electronic device 401 may determine whether a motion is detected based on the at least one sensor module 540. For example, the second electronic device 401 may obtain sensor data through the at least one sensor module 540, and may determine whether the second electronic device 401 is moved through the obtained sensor data.

When the motion of the second electronic device 401 is not detected in operation 1105, the second electronic device 401 may determine whether a designated time elapses in the state in which the motion of the second electronic device 401 is not detected in operation 1119. For example, the second electronic device 401 may determine whether the motion of the second electronic device 401 is not detected for the designated time. When the designated time does not elapse, the second electronic device 401 may return to operation 1105. When the designated time elapses, the second electronic device 401 may enter a sleep mode in operation 1121. According to one embodiment, the second electronic device 401 may inactivate at least one module and/or at least one function to save power during the sleep mode.

In operation 1123, the second electronic device 401 may determine not to control the vehicle. For example, the second electronic device 401 may determine that the second electronic device 401 does not approach the vehicle and also determine that the user has no intention of using the second electronic device 401, and may determine that it is not necessary to control the vehicle.

When the motion of the second electronic device 401 is detected in operation 1105, the second electronic device 401 may determine location information of the vehicle and the second electronic device 401 in operation 1107. According to one embodiment, the second electronic device 401 may obtain the location information of the vehicle in advance from the first electronic device 201 mounted in the vehicle. For example, the second electronic device 401 may obtain location information of the vehicle corresponding to a time at which the ignition of the vehicle is turned off from the first electronic device 201 at the time when the event in which the ignition of the vehicle is turned off occurs. The location information of the vehicle may be location information of the first electronic device 201. According to one embodiment, the second electronic device 401 may obtain location information of the second electronic device 401 at the time when the event in which the ignition of the vehicle is turned off occurs, and may determine the obtained location information as the location information of the vehicle. For example, since the second electronic device 401 may exist in the vehicle or exists in the proximity of the vehicle at the time when the event in which the ignition of the vehicle is turned off occurs, the second electronic device 401 may determine the location information of the second electronic device 401 corresponding to the time at which the event in which the ignition of the vehicle is turned off occurs, as the location information of the vehicle. According to one embodiment, the location information of the second electronic device 401 may be location information of the second electronic device 401 that is obtained at a time when the motion of the second electronic device 401 is detected. According to various embodiments, the location information of the vehicle and the second electronic device 401 may include at least one of latitude information, longitude information, and altitude information. The latitude and longitude may be obtained through a GPS receiver of the first electronic device and/or the second electronic device, and the altitude information may be obtained through a barometer sensor 540C of the first electronic device 201 and/or the second electronic device 401.

In operation 1107, the second electronic device 401 may determine whether the second electronic device 401 is within a threshold distance from the vehicle based on the locations of the vehicle and the second electronic device 401. For example, the second electronic device 401 may determine a distance between the vehicle and the second electronic device 401 based on the latitude and longitude of the vehicle and the latitude and longitude of the second electronic device 401, and may determine whether the second electronic device 401 is within the threshold distance from the vehicle based on the determined distance. In another example, the second electronic device 401 may determine a difference in altitude between the vehicle and the second electronic device 401 based on the altitude of the vehicle and the altitude of the second electronic device 401, and may determine whether the second electronic device 401 is within the threshold distance from the vehicle by comparing the determined altitude difference with a pre-set altitude difference. When the determined altitude difference is smaller or equal to the pre-set altitude difference, the second electronic device 401 may determine that the second electronic device 401 is within the threshold distance from the vehicle. When the determined altitude distance is greater than the pre-set altitude difference, the second electronic device 401 may determine that the second electronic device 401 is out of the threshold distance from the vehicle.

When it is determined that the second electronic device 401 is out of the threshold distance from the vehicle in operation 1109, the second electronic device 401 may determine not to control the vehicle in operation 1117. For example, since the second electronic device 401 does not approach the vehicle, the second electronic device 401 may determine that it is not necessary to control the vehicle.

When it is determined that the second electronic device 401 is within the threshold distance from the vehicle in operation 1109, the second electronic device 401 may determine whether the distance between the vehicle and the second electronic device 401 is reduced in operation 1111. For example, the second electronic device 401 may periodically obtain the location information of the second electronic device 401, and may determine whether the distance between the vehicle and the second electronic device 401 is reduced.

When the distance between the vehicle and the second electronic device 401 is not reduced, the second electronic device 401 may determine not to control the vehicle in operation 1117. For example, since the second electronic device 401 does not approach the vehicle, the second electronic device 401 may determine that it is not necessary to control the vehicle.

When the distance between the vehicle and the second electronic device 401 is reduced, the second electronic device 401 may determine to control the vehicle in operation 1113. For example, since the second electronic device 401 approaches the vehicle, the second electronic device 401 may determine that it is necessary to control the vehicle.

In operation 1115, the second electronic device 401 may determine whether a vehicle control state determined at a current time and a vehicle control state determined at a previous time are equal to each other. When the vehicle control state determined at the current time and the vehicle control state determined at the previous time are equal to each other, the second electronic device 401 may finish the procedure according to various embodiments. For example, when the vehicle control state determined at the current time and the vehicle control state determined at the previous time are equal to each other, the second electronic device 401 may determine that processing regarding the vehicle control state determined at the current time has been already performed.

When the vehicle control state determined at the current time and the vehicle control state determined at the previous time are not equal to each other, the second electronic device 401 may return to the process of controlling an activation state illustrated in FIG. 9.

Figure 12:
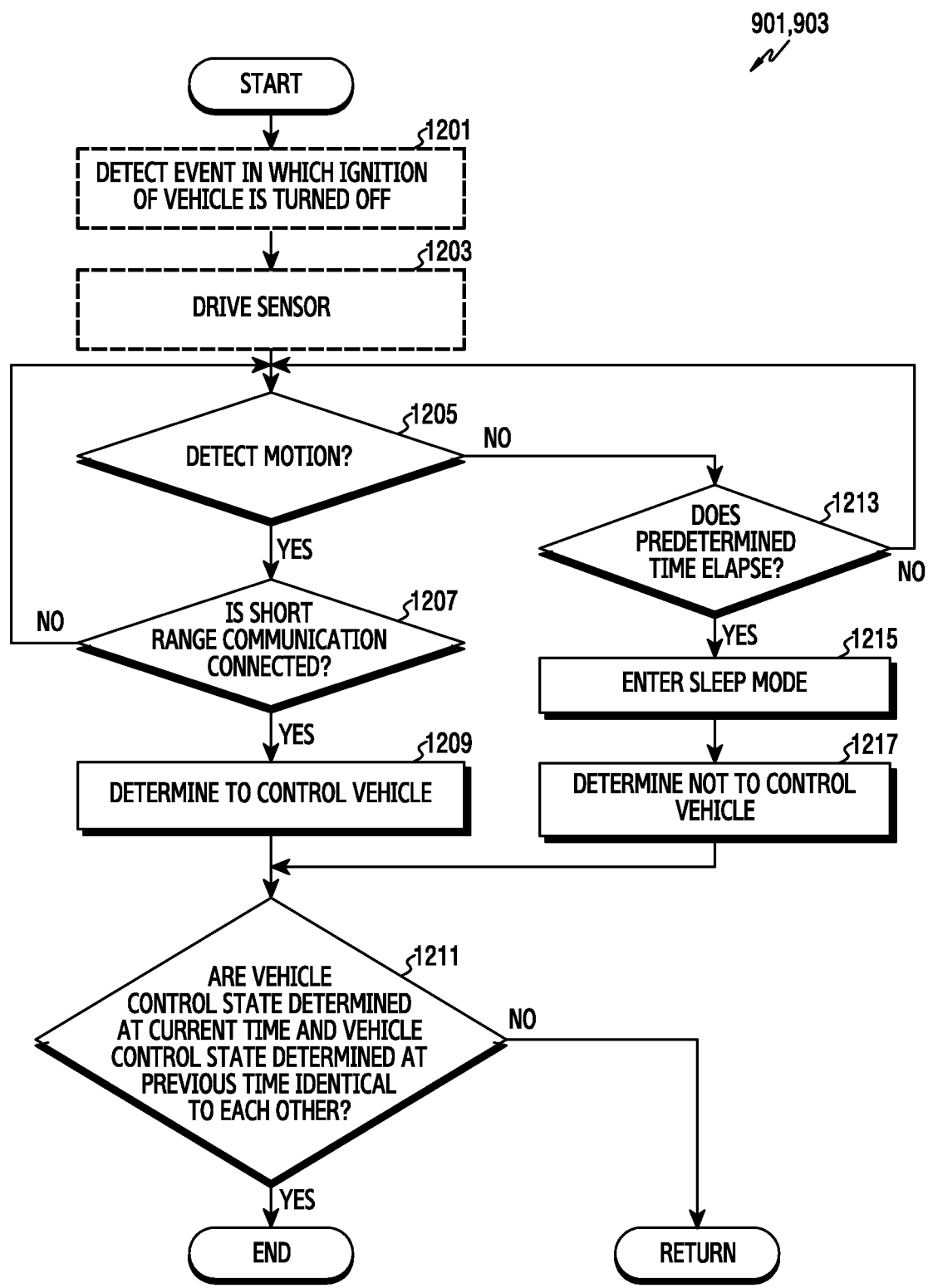
FIG. 12 illustrates a flowchart for controlling, in the second electronic device, an activation state of the second communication module included in the first electronic device based on sensor information and whether short range communication is connected according to various embodiments of the present disclosure.

FIG. 12 illustrates a flowchart for controlling, in the second electronic device, an activation state of the second communication module included in the first electronic device based on sensor information and whether short range communication is connected according to various embodiments. FIG. 12 illustrates operations 901 and 903 of FIG. 9 in detail. In the following embodiments, operations may be performed in sequence, but the present disclosure is not limited thereto. For example, the order of the operations may be changed or at least two operations may be performed in parallel. Herein, the first electronic device may be the first electronic device 100 of FIG. 1 and/or the first electronic device 201 of FIG. 2, and the second electronic device may be the second electronic device 110 of FIG. 1, second electronic device 401 of FIG. 4, and/or the second electronic device 501 of FIG. 5. In FIG. 11, operations of the blocks represented by dashed lines may be omitted according to an embodiment.

Referring to FIG. 12, operations 1201, 1203, 1205, 1213, 1215, and 1217 are the same as operations 1101, 1103, 1105, 1119, 1121, and 1123 of FIG. 11, and thus explanation of the above-mentioned operations of FIG. 12 is omitted.

When the motion of the second electronic device 401 is not detected in operation 1205, the second electronic device 401 may determine whether the second electronic device 401 is connected with the first electronic device 201 via short range communication in operation 1207. For example, when the motion of the second electronic device 401 is not detected, the second electronic device 401 may drive at least one short range communication module (for example, BT or WiFi) and may determine whether the second electronic device 401 is connected with the first electronic device 201 via a driven short range communication module.

When the second electronic device 401 is connected with the first electronic device 201 via short range communication, the second electronic device 401 may determine to control the vehicle in operation 1209. For example, since the second electronic device 401 is positioned at a distance at which it can connect short range communication with the first electronic device 201, the second electronic device 401 may determine that the second electronic device 401 approaches the vehicle and may determine that it is necessary to control the vehicle.

When the second electronic device 401 is not connected with the first electronic device 201 via short range communication, the second electronic device 401 may perform operation 1205 again.

After determining to control the vehicle, the second electronic device 401 may determine whether a vehicle control state determined at a current time and a vehicle control state determined at a previous time are equal to each other in operation 1211. For example, when the vehicle control state determined at the current time and the vehicle control state determined at the previous time are equal to each other, the second electronic device 401 may finish the process illustrated in FIG. 12, according to various embodiments. For example, when the vehicle control state determined at the current time and the vehicle control state determined at the previous time are equal to each other, the second electronic device 401 may determine that processing regarding the vehicle control state determined at the current time has been already performed.

When the vehicle control state determined at the current time and the vehicle control state determined at the previous time are not equal to each other, the second electronic device 401 may return to FIG. 9.

In FIG. 12, when the motion of the second electronic device 401 is detected, the second electronic device 401 may determine whether to connect short range communication with the first electronic device 201. However, according to various embodiments, when the motion of the second electronic device 401 is detected, the second electronic device 401 may examine whether it is possible to obtain location information of the second electronic device 401, and may determine whether to try to connect short range communication with the first electronic device 201. For example, when it is impossible to obtain the location information of the second electronic device 401, the second electronic device 401 may determine whether to control the vehicle based on whether short range communication is connected with the first electronic device 201 as shown in FIG. 12. In another example, when it is impossible to obtain the location information of the second electronic device 401, the second electronic device 401 may perform operations 1107, 1109, 1111, 1113, 1115, and 1117 of FIG. 11.

Figure 13:
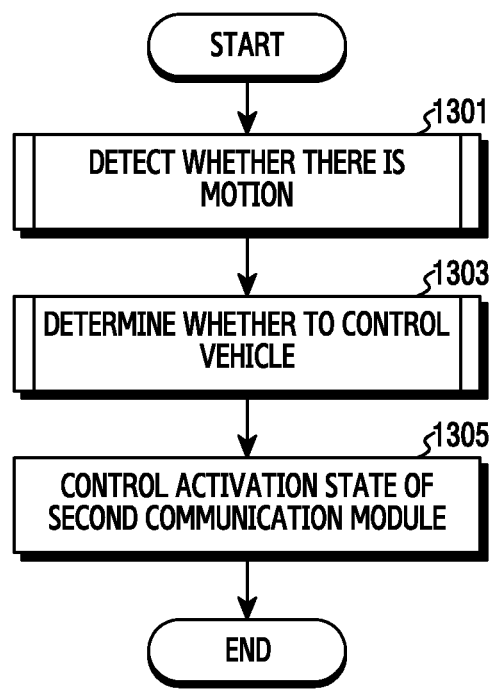
FIG. 13 illustrates a flowchart for controlling, in the second electronic device, an activation state of the second communication module included in the second electronic device according to various embodiments of the present disclosure.

FIG. 13 illustrates a flowchart for controlling, in the second electronic device, an activation state of the second communication module included in the second electronic device according to various embodiments. In the following embodiments, operations may be performed in sequence, but the present disclosure is not limited thereto. For example, the order of the operations may be changed or at least two operations may be performed in parallel. Herein, the first electronic device may be the first electronic device 100 of FIG. 1 and/or the first electronic device 201 of FIG. 2, and the second electronic device may be the second electronic device 110 of FIG. 1, the second electronic device 401 of FIG. 4, and/or the second electronic device 501 of FIG. 5.

Referring to FIG. 13, in operation 1301, the second electronic device 401 may detect whether there is a motion of the second electronic device 401. According to one embodiment, the second electronic device 401 may detect whether a motion occurs based on at least one sensor module 540 (for example, an acceleration sensor 540E, a gyro sensor 540B, a geomagnetic sensor, a barometer sensor 540C, or the like).

In operation 1303, the second electronic device 401 may determine whether to control the vehicle based on whether there is a motion of the second electronic device 401. For example, the second electronic device 401 may determine whether it is necessary to control the vehicle via the second communication module based on whether there is a motion of the second electronic device 401. According to one embodiment, the second electronic device 401 may determine whether the second electronic device 401 approaches the vehicle and/or whether the user has an intention of using the second electronic device 401 based on the motion of the second electronic device. When the motion of the second electronic device 401 is not detected, the second electronic device 401 may determine that the second electronic device 401 does not approach the vehicle or that the user has no intention of using the second electronic device 401, and may determine that it is not necessary to control the vehicle via the second communication module. In another example, when the motion of the second electronic device 401 is detected, the second electronic device 401 may determine that the second electronic device 401 approaches the vehicle or that the user has the intention of using the second electronic device 401, and may determine that it is necessary to control the vehicle via the second communication module. Operations 1301 and 1303 may be performed in the same was as operations 901 and 903 of FIG. 9. For example, operations 1301 and 1303 may include operations as shown in FIGS. 11 and 112.

In operation 1305, the second electronic device 401 may control the activation state of the second communication module included in the second electronic device 401 based on whether it is necessary to control the vehicle. For example, when it is necessary to control the vehicle, the second electronic device 401 may activate the LF-UHF module 527 included in the second electronic device 401. In another example, when it is not necessary to control the vehicle, the second electronic device 401 may inactivate the LF-UHF module 527 included in the second electronic device 401. Controlling the activation state of the second communication module may refer to controlling the activation state of at least one of the LF receiver and the UHF transmitter included in the LF-UHF module 527. For example, when it is not necessary to control the vehicle, the second electronic device 401 may inactivate the LF receiver included in the second electronic device 401, and may control such that an LF signal is not received at the second electronic device 401 although the LF signal is transmitted from the first electronic device 201 of the vehicle. In another example, when it is not necessary to control the vehicle, the second electronic device 401 may inactivate the UHF transmitter included in the second electronic device 401, and may control such that a UHF signal, which is a response signal, is not transmitted although an LF signal is received from the first electronic device 201 of the vehicle.

In the above-described embodiments, for convenience of explanation, the first electronic device 201, which is the electronic device for the vehicle, includes the LF transmitter to transmit an LF signal and the UHF receiver to receive a UHF signal, and the second electronic device 401, which remotely controls the vehicle, includes the LF receiver to receive an LF signal, and the UHF transmitter to transmit a UHF signal. However, according to various embodiments, the first electronic device 201 may further include a UHF transmitter and the second electronic device 401 may further include a UHF receiver. When the first electronic device 201 further includes the UHF transmitter, the first electronic device 201 may control the activation state of the UHF transmitter in the same method as the method for controlling the activation state of the LF transmitter. For example, the first electronic device 201 may control the activation state of the UHF transmitter included in the first electronic device 201 based on a signal received from the second electronic device 401 via the cellular module. In addition, when the second electronic device 401 further includes the UHF receiver, the second electronic device 401 may control the activation state of the UHF receiver in the same method as the method for controlling the activation state of the LF receiver. For example, the second electronic device 401 may control the activation state of the UHF receiver included in the second electronic device 401 based on a motion of the second electronic device 401.

According to various embodiments, an operating method of an electronic device may include: detecting a motion of the electronic device; and, based on motion information of the electronic device, transmitting a signal for controlling an activation state regarding low-frequency communication with another electronic device to another electronic device via a cellular communication module.

According to various embodiments, transmitting to another electronic device may include: when a motion of the electronic device is not detected, transmitting a signal for inactivating a communication module supporting low frequency communication of another electronic device to another electronic device via the cellular communication module; and, when the motion of the electronic device is detected, transmitting a signal for activating the communication module supporting the low frequency communication with another electronic device to another electronic device via the cellular communication module.

According to various embodiments, transmitting to another electronic device may include transmitting a signal for controlling the activation state regarding the low frequency communication with another electronic device to another electronic device via the cellular communication module, by further considering location information of the electronic device and location information of another electronic device.

According to various embodiments, the location information may include at least one of latitude information, longitude information, and altitude information.

According to various embodiments, transmitting to another electronic device may include transmitting the signal for controlling the activation state regarding the low frequency communication with another electronic device to another electronic device via the cellular communication module, by further considering whether short range wireless communication is connected with another electronic device.

According to various embodiments, the method may further include displaying information related to the activation state of the low frequency communication with another electronic device on a display.

According to various embodiments, the electronic device may be an electronic device that remotely controls a vehicle, and another electronic device may be an electronic device that is mounted in the vehicle.

According to various embodiments, an operating method of an electronic device may include: inactivating a first communication module for low frequency communication with another electronic device; receiving a signal for activating the first communication module from another electronic device via a second communication module supporting cellular communication; and activating the first communication module in response to the signal being received.

According to an electronic device and an operating method thereof according to various embodiments, the electronic device controls the activation state of an LF-UHF module included in another electronic device via a cellular module, thereby preventing an illegal attack using an LF signal while the electronic device does not approach another electronic device.

According to an electronic device and an operating method thereof according to various embodiments, the electronic device controls the activation state of an LF-UHF module, such that the electronic device can maintain security of another electronic device even when an illegal attack occurs regarding an LF signal transmitted from another electronic device while the electronic device does not approach another electronic device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 220), may cause the one or more processors to execute the function corresponding to the instruction. The computer-readable storage medium may be, for example, the memory 230.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first communication circuit configured to support low frequency communication and high frequency communication;
   a second communication circuit configured to support cellular communication via a cellular communication network;
   at least one sensor;
   at least one processor; and
   a memory electrically connected with the processor,
   wherein the memory is configured to store instructions that, when executed by the at least one processor, are configured to cause the at least one processor to:
      receive from another electronic device, via the cellular communication network, a signal indicating that a third communication circuit of the another electronic device that supports the low frequency communication with the another electronic device is in an inactivated state,
      detect a motion of the electronic device based on the at least one sensor, and
      transmit to the another electronic device, via the cellular communication network, a signal for controlling the third communication circuit of the another electronic device, to move from the inactivated state to an activated state, the signal for controlling the third communication circuit based on motion information of the electronic device.

2. The electronic device of claim 1, wherein the instructions comprise instructions that cause the processor to, when the motion of the electronic device is detected, to transmit a signal for activating the third communication circuit to the another electronic device via the cellular communication network.

3. The electronic device of claim 1, wherein the instructions comprise instructions that cause the processor to transmit, to the another electronic device via the cellular communication network, the signal for controlling the activation state of the third communication circuit of the another electronic device that supports the low frequency communication with the another electronic device, by further considering location information of the electronic device and location information of the another electronic device.

4. The electronic device of claim 3, wherein the location information comprises at least one of latitude information, longitude information, or altitude information.

5. The electronic device of claim 1, wherein the instructions comprise instructions that cause the processor to transmit, to the another electronic device via the cellular communication network, the signal for controlling the activation state of the third communication circuit of the another electronic device that supports the low frequency communication with the another electronic device, by further considering whether short range wireless communication is connected with the another electronic device.

6. The electronic device of claim 1, further comprising a display,
   wherein the instructions comprise instructions that cause the processor to display information related to the activation state of the low frequency communication with the another electronic device on the display.

7. The electronic device of claim 1, wherein the instructions comprise instructions that cause the processor to control an activation state of the first communication circuit based on motion information of the electronic device.

8. The electronic device of claim 1, wherein the instructions comprise instructions that cause the processor to receive, from the another electronic device via the cellular communication network, a signal indicating an activation state of the third communication circuit of the another electronic device.

9. The electronic device of claim 1, wherein the electronic device is an electronic device configured to remotely control a vehicle, and
wherein the another electronic device is an electronic device that is mounted in the vehicle.

10. An electronic device comprising:
a first communication circuit configured to support low frequency communication and high frequency communication;
a second communication circuit configured to support cellular communication via a cellular communication network;
at least one processor; and
a memory electrically connected with the processor,
wherein the memory is configured to store instructions that, when executed by the at least one processor, are configured to cause the at least one processor to:
inactivate the first communication circuit;
transmit a signal indicating that the first communication circuit is inactivated to another electronic device via the cellular communication network;
receive, via the cellular communication network from the another electronic device, a signal for activating the first communication circuit by activating at least one of a low frequency transmitter or a high frequency receiver of the first communication circuit; and
activate the first communication circuit in response to the signal being received.

11. The electronic device of claim 10, wherein the instructions comprise instructions that cause the processor to:
control the first communication circuit to transmit a low frequency signal; and
inactivate the first communication circuit when a response signal to the low frequency signal is not received.

12. The electronic device of claim 10, wherein the instructions comprise instructions that cause the processor to receive a signal for inactivating the first communication circuit from the another electronic device via the cellular communication network, and to inactivate the first communication circuit in response to the signal for inactivating being received.

13. The electronic device of claim 10, wherein the electronic device is an electronic device that is mounted in a vehicle, and the another electronic device is an electronic device configured to remotely control the vehicle.

14. An operating method of an electronic device, the method comprising:

receiving from another electronic device, via a cellular communication network, a signal indicating that a third communication circuit of the another electronic device that supports low frequency communication with the another electronic device is in an inactivated state,
detecting a motion of the electronic device; and
based on motion information of the electronic device, transmitting, to the another electronic device via the cellular communication network, a signal for controlling a low frequency (LF)-ultra high-frequency (UHF) circuit of the another electronic device to move from the inactivated state to an activated state, the LF-UHF circuit configured to support the low frequency communication with the another electronic device.

15. The method of claim 14, wherein transmitting the signal to the another electronic device comprises:
when the motion of the electronic device is detected, transmitting a signal for activating a communication circuit supporting the low frequency communication of the another electronic device to the another electronic device via the cellular communication network.

16. The method of claim 14, wherein transmitting the signal to the another electronic device comprises transmitting a signal for controlling the activation state regarding the low frequency communication with the another electronic device to the another electronic device via the cellular communication network, by further considering location information of the electronic device and location information of the another electronic device.

17. The method of claim 16, wherein the location information comprises at least one of latitude information, longitude information, or altitude information.

18. The method of claim 14, wherein transmitting the signal to the another electronic device comprises transmitting the signal for controlling the activation state regarding the low frequency communication with the another electronic device to the another electronic device via the cellular communication network, by further considering whether short range wireless communication is connected with the another electronic device.

19. The method of claim 14, further comprising displaying information related to the activation state of the low frequency communication with the another electronic device on a display.

20. The method of claim 14, wherein the electronic device is an electronic device configured to remotely control a vehicle, and
wherein the another electronic device is an electronic device that is mounted in the vehicle.

* * * * *